US009393836B2

(12) United States Patent
Mochinaga et al.

(10) Patent No.: US 9,393,836 B2
(45) Date of Patent: Jul. 19, 2016

(54) BEARING FOR WHEEL, AND BEARING DEVICE FOR WHEEL

(71) Applicants: Shuji Mochinaga, Shizuoka (JP); Takayuki Norimatsu, Shizuoka (JP)

(72) Inventors: Shuji Mochinaga, Shizuoka (JP); Takayuki Norimatsu, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/433,944

(22) PCT Filed: Sep. 30, 2013

(86) PCT No.: PCT/JP2013/076475
§ 371 (c)(1),
(2) Date: Apr. 7, 2015

(87) PCT Pub. No.: WO2014/069137
PCT Pub. Date: May 8, 2014

(65) Prior Publication Data
US 2015/0273939 A1 Oct. 1, 2015

(30) Foreign Application Priority Data

Oct. 30, 2012 (JP) .................................. 2012-238888
Jul. 19, 2013 (JP) .................................. 2013-150569

(51) Int. Cl.
*B60B 27/00* (2006.01)
*F16C 19/18* (2006.01)
*F16C 35/073* (2006.01)

(52) U.S. Cl.
CPC ............. *B60B 27/0005* (2013.01); *B60B 27/00* (2013.01); *B60B 27/0031* (2013.01);
(Continued)

(58) Field of Classification Search
CPC .. B60B 27/0005; B60B 27/00; B60B 27/001; B60B 27/0094; B60B 27/0031; B60B 2380/12; F16C 19/18; F16C 19/186; F16C 2226/12; F16C 2226/80; F16C 2326/02
See application file for complete search history.

(56) References Cited

U.S. PATENT DOCUMENTS

| 5,527,126 A | * | 6/1996 | Digel | ..................... B60K 17/22 403/280 |
| 6,190,262 B1 | * | 2/2001 | Miyazaki | ................ F16D 3/223 464/145 |
| 2013/0172088 A1 | * | 7/2013 | Umekida | .............. F16D 1/0858 403/359.1 |

FOREIGN PATENT DOCUMENTS

JP 62-251522 11/1987
JP 7-167116 7/1995
(Continued)

OTHER PUBLICATIONS

International Search Report issued Oct. 29, 2013 in International (PCT) Application No. PCT/JP2013/076475.
(Continued)

*Primary Examiner* — John Walters
*Assistant Examiner* — James Triggs
(74) *Attorney, Agent, or Firm* — Wenderoth, Lind & Ponack, L.L.P.

(57) ABSTRACT

A bearing device for a wheel has a bearing including an outer race having double-row outer raceway surfaces formed on an inner circumference thereof, a hub wheel and an inner race having double-row inner raceway surfaces formed on an outer circumference thereof so as to be opposed to the outer raceway surfaces, and double-row rolling elements interposed between the inner and outer raceway surfaces. The bearing has a constant velocity universal joint coupled thereto with a screw fastening structure by fitting a stem section of an outer joint member to a shaft hole of the hub wheel, in which the shaft hole of the hub wheel is formed by penetrating the hub wheel into a cylindrical shape over an axial direction of the hub wheel.

6 Claims, 21 Drawing Sheets

(52) U.S. Cl.
CPC ......... *B60B27/0042* (2013.01); *B60B 27/0094* (2013.01); *F16C 19/18* (2013.01); *F16C 19/186* (2013.01); *F16C 35/073* (2013.01); *B60B 27/0084* (2013.01); *B60B 2310/316* (2013.01); *B60B 2380/12* (2013.01); *B60B 2380/73* (2013.01); *B60B 2900/113* (2013.01); *B60B 2900/212* (2013.01); *F16C 2226/12* (2013.01); *F16C 2226/80* (2013.01); *F16C 2326/02* (2013.01)

(56) References Cited

FOREIGN PATENT DOCUMENTS

| | | |
|---|---|---|
| JP | 2005-81868 | 3/2005 |
| JP | 2009-97557 | 5/2009 |
| JP | 2010-47042 | 3/2010 |
| JP | 2011-240857 | 12/2011 |
| JP | 2012-35798 | 2/2012 |
| JP | 2012-62013 | 3/2012 |

OTHER PUBLICATIONS

International Preliminary Report on Patentability and Written Opinion of the International Searching Authority issued May 5, 2015 in International (PCT) Application No. PCT/JP2013/076475.

* cited by examiner

BEARING FOR WHEEL, AND BEARING DEVICE FOR WHEEL

TECHNICAL FIELD

The present invention relates to a bearing for a wheel and a bearing device for a wheel, which rotatably support a driving wheel (front wheel of a front-engine front-drive (FF) vehicle, rear wheel of a front-engine rear-drive (FR) vehicle, and all wheels of a four-wheel drive (4WD) vehicle with respect to, for example, a suspension device for an automobile.

BACKGROUND ART

As a related-art bearing device for a wheel, for example, there is proposed a bearing device for a wheel, which is configured so that a hub wheel is separable from an outer joint member of a constant velocity universal joint to attain excellent maintainability (see, for example, Patent Literature 1). As illustrated in FIG. 20, the bearing device for a wheel as disclosed in Patent Literature 1 includes, as main components thereof, a fixed type constant velocity universal joint 106, and a bearing 120 for a wheel including a hub wheel 101, an inner race 102, double-row rolling elements 103 and 104, and an outer race 105.

The hub wheel 101 has an inner raceway surface 107 on an outboard side formed on an outer circumferential surface thereof, and includes a wheel mounting flange 109 for allowing a wheel (not shown) to be mounted thereto. Hub bolts 110 for fixing a wheel disc are equiangularly embedded in the wheel mounting flange 109. The inner race 102 is fitted to a small-diameter step portion 112 formed on an outer circumferential surface of the hub wheel 101 on the inboard side, and an inner raceway surface 108 on the inboard side is formed on an outer circumferential surface of the inner race 102.

The inner race 102 is press-fitted with an adequate interference for the purpose of preventing creep. The inner raceway surface 107 on the outboard side that is formed on the outer circumferential surface of the hub wheel 101 and the inner raceway surface 108 on the inboard side that is formed on the outer circumferential surface of the inner race 102 correspond to double-row inner raceway surfaces. The inner race 102 is press-fitted to the small-diameter step portion 112 of the hub wheel 101, and the end portion of the small-diameter step portion 112 on the inboard side is crimped outward. As a result, the inner race 102 is retained by a crimped portion 111 thus formed and integrated with the hub wheel 101, to thereby apply preload to the bearing 120 for a wheel.

The outer race 105 has double-row outer raceway surfaces 113 and 114 formed on an inner circumferential surface thereof so as to be opposed to the inner raceway surfaces 107 and 108 of the hub wheel 101 and the inner race 102. An outer circumferential surface of the outer race 105 is fitted and fixed to a knuckle extending from a suspension device (not shown) of a vehicle body, and thus the bearing device for a wheel is mounted to the vehicle body.

The bearing 120 for a wheel has a double-row angular contact ball bearing structure. Specifically, the rolling elements 103 and 104 are interposed between the inner raceway surfaces 107 and 108 formed on the outer circumferential surfaces of the hub wheel 101 and the inner race 102 and the outer raceway surfaces 113 and 114 formed on the inner circumferential surface of the outer race 105, and the rolling elements 103 and 104 in the respective rows are equiangularly supported by retainers 115 and 116.

In opening portions of the bearing 120 for a wheel at both ends thereof, a pair of seals 117 and 118 for sealing annular spaces between the outer race 105 and the hub wheel 101 and between the outer race 105 and the inner race 102 so as to be held in sliding-contact with the outer circumferential surfaces of the hub wheel 101 and the inner race 102 is fitted to a radially inner part of the outer race 105 at both end portions thereof. The seals 117 and 118 prevent leakage of grease filled inside and entry of water and foreign matter from the outside.

The constant velocity universal joint 106 includes an outer joint member 124 being arranged at one end of an intermediate shaft 122 serving as a drive shaft 121 and having track grooves 123 formed in an inner circumferential surface thereof, an inner joint member 126 having track grooves 125 formed in an outer circumferential surface thereof so as to be opposed to the track grooves 123 of the outer joint member 124, balls 127 assembled into spaces between the track grooves 123 of the outer joint member 124 and the track grooves 125 of the inner joint member 126, and a cage 128 interposed between the inner circumferential surface of the outer joint member 124 and the outer circumferential surface of the inner joint member 126 so as to retain the balls 127.

The outer joint member 124 includes a mouth section 129 for accommodating internal components such as the inner joint member 126, the balls 127, and the cage 128, and a stem section 130 integrally extending from the mouth section 129 in an axial direction. An axial end of the intermediate shaft 122 is press-fitted to the inner joint member 126, and is coupled by spline fitting so as to allow torque transmission therebetween.

A bellows-like boot 131 made of a resin is mounted between the outer joint member 124 of the constant velocity universal joint 106 and the intermediate shaft 122 so as to prevent leakage of a lubricant such as grease filled inside the joint, and to prevent entry of foreign matter from outside the joint, thereby attaining a structure of closing an opening portion of the outer joint member 124 with the boot 131.

The boot 131 includes a large-diameter end portion 133 fixed to an outer circumferential surface of the outer joint member 124 by fastening with a boot band 132, a small-diameter end portion 135 fixed to an outer circumferential surface of the intermediate shaft 122 by fastening with a boot band 134, and a flexible bellows portion 136 connecting the large-diameter end portion 133 and the small-diameter end portion 135 and being reduced in diameter in a range of from the large-diameter end portion 133 toward the small-diameter end portion 135.

FIG. 21 illustrates a state before press-fitting the stem section 130 of the outer joint member 124 to a shaft hole 138 of the hub wheel 101. As illustrated in FIG. 21, a male spline including a plurality of convex portions 137 extending in the axial direction is formed on an outer circumferential surface of the stem section 130 of the outer joint member 124. On the other hand, a simple cylindrical portion 139 having no female spline formed thereon is formed on an inner circumferential surface of the shaft hole 138 of the hub wheel 101.

FIG. 22 illustrates a state after press-fitting the stem section 130 of the outer joint member 124 to the shaft hole 138 of the hub wheel 101. The stem section 130 of the outer joint member 124 is press-fitted to the shaft hole 138 of the hub wheel 101, and the shape of each convex portion 137 of the stem section 130 is transferred to the inner circumferential surface of the shaft hole 138 of the hub wheel 101. Thus, as illustrated in FIG. 22, concave portions 140 brought into close contact with the corresponding convex portions 137 with interferences therebetween are formed on the inner circumferential surface of the shaft hole 138 of the hub wheel 101, to thereby define a convex and concave fitting structure in which the convex portions 137 and the concave portions 140 are brought into close contact with each other at an entire fitting contact portion therebetween. As a result, the outer joint member 124 and the hub wheel 101 are coupled to each other so as to allow torque transmission therebetween.

As described above, under the state in which the stem section 130 of the outer joint member 124 is press-fitted to the shaft hole 138 of the hub wheel 101, as illustrated in FIG. 20, a bolt 142 is threadedly engaged with a female thread 141 formed at an axial end of the stem section 130 of the outer joint member 124, and is fastened in a state of being locked on an end surface of the hub wheel 101, to thereby fix the constant velocity universal joint 106 to the hub wheel 101.

CITATION LIST

Patent Literature 1: JP 2009-97557 A

SUMMARY OF INVENTION

Technical Problems

Incidentally, in the above-mentioned bearing device for a wheel, the fixed type constant velocity universal joint 106 to be coupled to the bearing 120 for a wheel including the hub wheel 101, the inner race 102, the double-row rolling elements 103 and 104, and the outer race 105 corresponds to a part of the drive shaft 121. It is necessary that the drive shaft 121 for transmitting power from an engine of an automobile to a wheel thereof be adaptable to angular displacement and axial displacement caused by a change in relative positional relationship between the engine and the wheel. Therefore, as in the structure illustrated in FIG. 23, a plunging type constant velocity universal joint 151 and the fixed type constant velocity universal joint 106 are generally installed on the engine side (inboard side) and the wheel side (outboard side), respectively, and both the constant velocity universal joints 106 and 151 are coupled to each other through intermediation of the intermediate shaft 122.

In this case, in the related-art bearing device for a wheel, as illustrated in FIG. 21, the simple cylindrical portion 139 having no female spline formed thereon is formed on the inner circumferential surface of the shaft hole 138 of the hub wheel 101. Therefore, when press-fitting the stem section 130 of the outer joint member 124 to the shaft hole 138 of the hub wheel 101, a significant press-fitting load is required to transfer the shape of each convex portion 137 of the stem section 130 to the inner circumferential surface of the shaft hole 138, thereby being necessary to use a press machine or the like. For this reason, in the current circumstances, the bearing device for a wheel needs to be mounted to the vehicle body under a state in which the constant velocity universal joint 106 of the drive shaft 121 is mounted to the bearing 120 for a wheel.

At the time of assembling the vehicle in an automobile manufacturer, the bearing device for a wheel is handled under a state in which the bearing 120 for a wheel and the constant velocity universal joint 106 of the drive shaft 121 are coupled to each other, that is, under a state in which the bearing 120 for a wheel and the two constant velocity universal joints 106 and 151 of the drive shaft 121 are integrated with each other. The minimum inner diameter dimension of a knuckle 152 (see FIG. 23) extending from the suspension device of the vehicle body is set larger than the maximum outer diameter dimension of each of the constant velocity universal joints 106 and 151, and hence the bearing device for a wheel is mounted to the vehicle body by, as illustrated in FIG. 24, sequentially inserting the plunging type constant velocity universal joint 151 and the fixed type constant velocity universal joint 106 of the drive shaft 121 through the knuckle 152 extending from the suspension device of the vehicle body, and then fitting and fixing the outer race 105 of the bearing 120 for a wheel to the knuckle 152.

The drive shaft 121 is an elongated assembly unit connecting the wheel side and the engine side, and hence the workability is poor in the above-mentioned method of mounting the bearing device for a wheel to the vehicle body by sequentially inserting the plunging type constant velocity universal joint 151 and the fixed type constant velocity universal joint 106 of the drive shaft 121 through the knuckle 152. As a result, the components of the drive shaft 121 may be damaged at the time of mounting the bearing device for a wheel.

Therefore, the present invention has been proposed in view of the above-mentioned problems, and it is an object thereof to provide a bearing for a wheel and a bearing device for a wheel, which are capable of enhancing workability when mounting the bearing device to a vehicle body and forestalling damage to components at the time of mounting the bearing device.

Solution to Problems

According to one embodiment of the present invention, there is provided a bearing device for a wheel having the following structure. Specifically, the bearing device for a wheel comprises a bearing for a wheel comprising: an outer member having double-row outer raceway surfaces formed on an inner circumference thereof; an inner member comprising a hub wheel and an inner race, the inner member having double-row inner raceway surfaces formed on an outer circumference thereof so as to be opposed to the double-row outer raceway surfaces; and double-row rolling elements interposed between the double-row outer raceway surfaces of the outer member and the double-row inner raceway surfaces of the inner member, the bearing for a wheel having a constant velocity universal joint coupled thereto with a screw fastening structure by fitting a stem section of an outer joint member of the constant velocity universal joint to a shaft hole of the hub wheel. As described above, the bearing device for a wheel comprises the bearing for a wheel and the constant velocity universal joint.

As a technical measure to achieve the above-mentioned object, the bearing device for a wheel according to the one embodiment of the present invention comprises such a bearing for a wheel that the shaft hole of the hub wheel is formed by penetrating the hub wheel into a cylindrical shape over an axial direction of the hub wheel, and that the hub wheel comprises concave portions formed on an inner circumferential surface of the shaft hole thereof by broaching so as to extend in the axial direction. A plurality of convex portions formed on an outer circumferential surface of the stem section of the outer joint member so as to extend in the axial direction are press-fitted to the shaft hole of the hub wheel comprising the plurality of concave portions formed so as to have interferences with the convex portions, respectively, and a shape of each of the convex portions is transferred to the inner circumferential surface of the shaft hole, to thereby define a convex and concave fitting structure in which the convex portions and the concave portions are brought into close contact with each other at an entire fitting contact portion therebetween.

In the present invention, the plurality of convex portions extending in the axial direction are formed on the stem section of the outer joint member, and the concave portions having interferences with the convex portions, respectively, are formed on the shaft hole of the hub wheel in advance. Further, when press-fitting the stem section of the outer joint member to the shaft hole of the hub wheel, the surface on which the concave portion is formed is cut by an extremely small amount due to each convex portion, to thereby transfer the shape of the convex portion to the surface on which the concave portion is formed while concomitantly causing extremely small plastic or elastic deformation of the surface on which the concave portion is formed due to the convex portion. At this time, the convex portion digs into the surface on which the concave portion is formed, thereby leading to a state in which the diameter of the inner circumferential surface of the shaft hole of the hub wheel is slightly increased. Thus, relative movement of the convex portion in the axial direction is allowed. When the relative movement of the convex portion in the axial direction is stopped, the diameter of the inner circumferential surface of the shaft hole of the hub wheel is reduced so as to recover the original diameter. Consequently, the convex portion and the concave portion are brought into close contact with each other at the entire fitting contact portion therebetween, with the result that the outer joint member and the hub wheel can firmly be coupled to and integrated with each other.

In this case, the concave portions having interferences with the convex portions, respectively, are formed in advance. Thus, the press-fitting load for bringing the convex portions and the concave portions into close contact with each other at the entire fitting contact portion therebetween can be reduced as compared to the related art in which the shape of each convex portion is transferred to the simple cylindrical portion. As a result, the outer joint member can be press-fitted to the hub wheel of the bearing for a wheel after the bearing for a wheel is mounted to the vehicle body, with the result that the constant velocity universal joint can easily be coupled to the bearing for a wheel.

Further, the present invention provides the structure in which the shaft hole of the hub wheel is formed by penetrating the hub wheel into a cylindrical shape over the axial direction, and hence the concave portions extending in the axial direction can be formed on the inner circumferential surface of the shaft hole of the hub wheel by broaching. As a result, the concave portions having interferences with the convex portions, respectively, can easily be formed on the shaft hole of the hub wheel in advance, thereby achieving cost reduction.

According to the one embodiment of the present invention, the screw fastening structure may comprise: a female thread portion formed at an axial end of the stem section of the outer joint member; and a male thread portion to be threadedly engaged with the female thread portion, the male thread portion being locked on a circumferential edge portion of an opening end of the shaft hole of the hub wheel. In the case of this structure, the shaft hole of the hub wheel is formed by penetrating the hub wheel into a cylindrical shape over the axial direction, and hence the male thread portion to be threadedly engaged with the female thread portion of the stem section is locked on the circumferential edge portion of the opening end of the shaft hole of the hub wheel, to thereby fix the constant velocity universal joint to the hub wheel.

Further, according to the one embodiment of the present invention, the screw fastening structure may comprise: a female thread portion formed at an axial end of the stem section of the outer joint member; and a male thread portion to be threadedly engaged with the female thread portion, the male thread portion being locked on an annular plate fitted to an opening end of the shaft hole of the hub wheel. In the case of this structure, the annular plate is fitted to the opening end of the shaft hole of the hub wheel, which is formed by penetrating the hub wheel into a cylindrical shape over the axial direction, and hence the male thread portion to be threadedly engaged with the female thread portion of the stem section is locked on the end surface of the annular plate, to thereby fix the constant velocity universal joint to the hub wheel.

In the structure according to the one embodiment of the present invention, it is desired that an end portion of the hub wheel on an inboard side be crimped radially outward so that the inner race is retained by a crimped portion and integrated with the hub wheel, and that the crimped portion be brought into abutment against a shoulder portion of the outer joint member of the constant velocity universal joint. When this crimping structure is employed, the inner race is retained by the crimped portion and integrated with the hub wheel, with the result that the bearing for a wheel is easily separable from the constant velocity universal joint.

Further, in the structure according to the one embodiment of the present invention, it is desired that an end surface of the inner race positioned on an inboard side of the hub wheel be brought into abutment against an end surface of a shoulder portion of the outer joint member of the constant velocity universal joint. When this non-crimping structure is employed, the weight can be reduced by an amount corresponding to the weight of the above-mentioned crimped portion, and the cost can be reduced because the crimping is unnecessary.

Advantageous Effects of Invention

According to the one embodiment of the present invention, the plurality of convex portions formed on the stem section of the outer joint member so as to extend in the axial direction are press-fitted to the shaft hole of the hub wheel comprising the plurality of concave portions formed so as to have interferences with the convex portions, respectively, and the shape of each of the convex portions is transferred to the inner circumferential surface of the shaft hole, to thereby define the convex and concave fitting structure in which the convex portions and the concave portions are brought into close contact with each other at the entire fitting contact portion therebetween. With the structure in which the concave portions having interferences with the convex portions, respectively, are formed in advance, the press-fitting load for bringing the convex portions and the concave portions into close contact with each other at the entire fitting contact portion therebetween can be reduced. As a result, the outer joint member can be press-fitted to the hub wheel of the bearing for a wheel after the bearing for a wheel is mounted to the vehicle body, with the result that the constant velocity universal joint can easily be coupled to the bearing for a wheel. Thus, the workability can be enhanced when mounting the bearing device for a wheel to the vehicle body, and the damage to the components can be forestalled at the time of mounting the bearing device for a wheel.

Further, with the structure in which the shaft hole of the hub wheel is formed by penetrating the hub wheel into a cylindrical shape over the axial direction, the concave portions extending in the axial direction can be formed on the inner circumferential surface of the shaft hole of the hub wheel by broaching. As a result, the concave portions having interferences with the convex portions, respectively, can easily be formed on the shaft hole of the hub wheel in advance, thereby achieving cost reduction.

DESCRIPTION OF EMBODIMENTS

Figure 1:
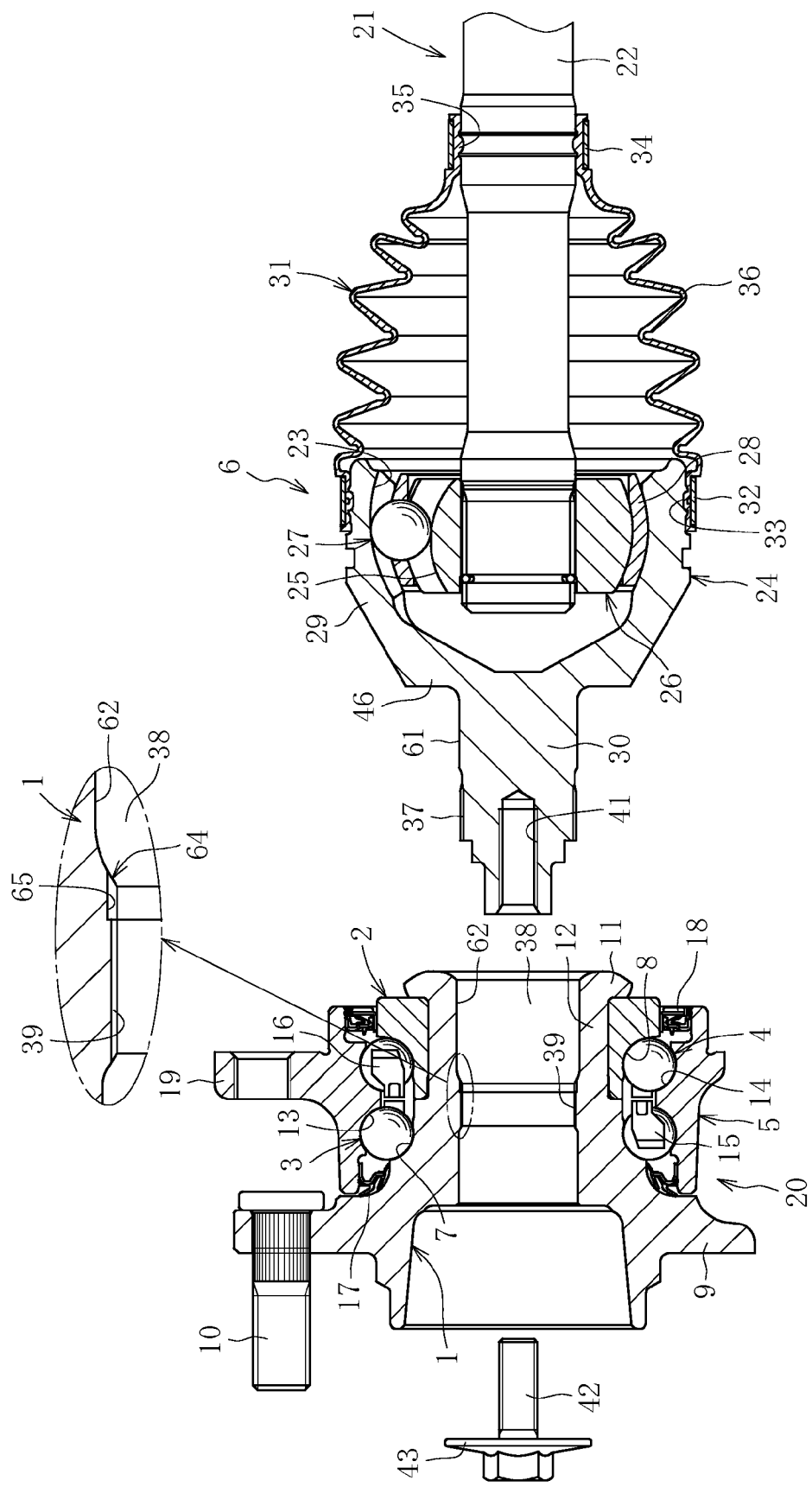
FIG. 1 is a sectional view illustrating a state before mounting a constant velocity universal joint to a bearing for a wheel having a crimping structure in a bearing device for a wheel according to an embodiment of the present invention.
Figure 2:
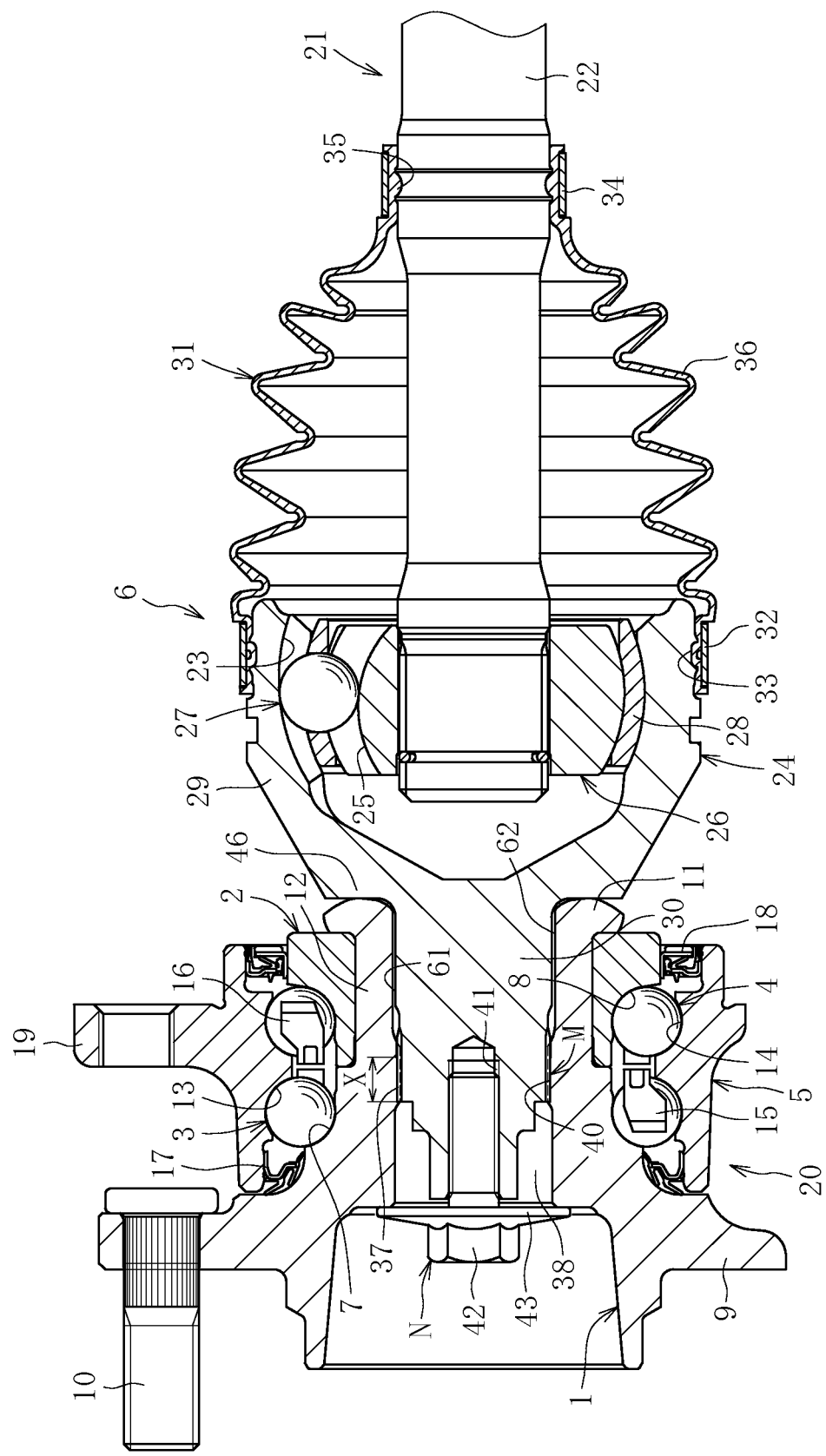
FIG. 2 is a sectional view illustrating a state after mounting the constant velocity universal joint to the bearing for a wheel of FIG. 1.

Now, a bearing device for a wheel according to embodiments of the present invention is described in detail. A bearing device for a wheel illustrated in FIGS. 1 and 2 comprises, as main components thereof, a constant velocity universal joint 6, and a bearing 20 for a wheel comprising a hub wheel 1 and an inner race 2 that serve as an inner member, double-row rolling elements 3 and 4, and an outer race 5. FIG. 1 illustrates a state before mounting the constant velocity universal joint 6 to the bearing 20 for a wheel, and FIG. 2 illustrates a state after mounting the constant velocity universal joint 6 to the bearing 20 for a wheel. Note that, in the following description, an outer side of a vehicle in a state in which the bearing device for a wheel is mounted to the vehicle is referred to as "outboard side" (left side of the figures), and a middle side of the vehicle is referred to as "inboard side" (right side of the figures).

The hub wheel 1 has an inner raceway surface 7 on the outboard side formed on an outer circumferential surface thereof, and comprises a wheel mounting flange 9 for allowing a wheel (not shown) to be mounted thereto. Hub bolts 10 for fixing a wheel disc are equiangularly embedded in the wheel mounting flange 9. The inner race 2 is fitted to a small-diameter step portion 12 formed on an outer circumferential surface of the hub wheel 1 on the inboard side, and an inner raceway surface 8 on the inboard side is formed on an outer circumferential surface of the inner race 2.

The inner race 2 is press-fitted with an adequate interference for the purpose of preventing creep. The inner raceway surface 7 on the outboard side that is formed on the outer circumferential surface of the hub wheel 1 and the inner raceway surface 8 on the inboard side that is formed on the outer circumferential surface of the inner race 2 correspond to double-row raceway surfaces. The inner race 2 is press-fitted to the small-diameter step portion 12 of the hub wheel 1, and the end portion of the small-diameter step portion 12 on the inboard side is crimped outward by orbital forming. As a result, the inner race 2 is retained by a crimped portion 11 thus formed and integrated with the hub wheel 1, to thereby apply preload to the bearing 20 for a wheel.

Figure 5:
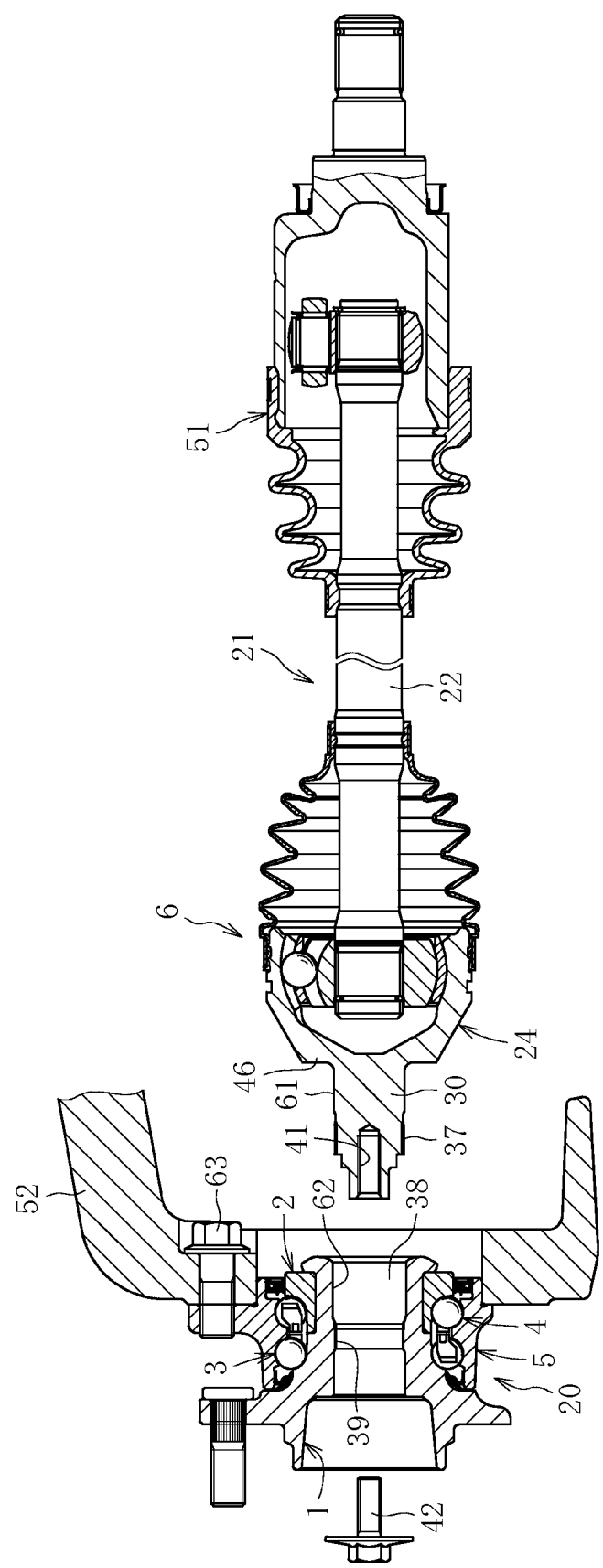
FIG. 5 is a sectional view illustrating a state before mounting the constant velocity universal joint of a drive shaft to the bearing for a wheel, which is mounted to a knuckle.

The outer race 5 has double-row outer raceway surfaces 13 and 14 formed on an inner circumferential surface thereof so as to be opposed to the inner raceway surfaces 7 and 8 of the hub wheel 1 and the inner race 2, and comprises a vehicle body mounting flange 19 for allowing the bearing device for a wheel to be mounted to a knuckle 52 extending from a suspension device of a vehicle body (not shown). As described later, the vehicle body mounting flange 19 is fitted to the above-mentioned knuckle 52, and is fixed thereto with bolts 63 (see FIG. 5).

The bearing 20 for a wheel has a double-row angular contact ball bearing structure. Specifically, the rolling elements 3 and 4 are interposed between the inner raceway surfaces 7 and 8 formed on the outer circumferential surfaces of the hub wheel 1 and the inner race 2 and the outer raceway surfaces 13 and 14 formed on the inner circumferential surface of the outer race 5, and the rolling elements 3 and 4 in the respective rows are equiangularly supported by retainers 15 and 16.

In opening portions of the bearing 20 for a wheel at both ends thereof, a pair of seals 17 and 18 for sealing annular spaces between the outer race 5 and the hub wheel 1 and between the outer race 5 and the inner race 2 so as to be held in sliding-contact with the outer circumferential surfaces of the hub wheel 1 and the inner race 2 is fitted to a radially inner part of the outer race 5 at both end portions thereof. The seals 17 and 18 prevent leakage of grease filled inside and entry of water and foreign matter from the outside.

The constant velocity universal joint 6 comprises an outer joint member 24 being arranged at one end of an intermediate shaft 22 serving as a drive shaft 21 and having track grooves 23 formed in an inner circumferential surface thereof, an inner joint member 26 having track grooves 25 formed in an outer circumferential surface thereof so as to be opposed to the track grooves 23 of the outer joint member 24, balls 27 assembled into spaces between the track grooves 23 of the outer joint member 24 and the track grooves 25 of the inner joint member 26, and a cage 28 interposed between the inner circumferential surface of the outer joint member 24 and the outer circumferential surface of the inner joint member 26 so as to retain the balls 27.

The outer joint member 24 comprises a mouth section 29 for accommodating internal components such as the inner joint member 26, the balls 27, and the cage 28, and a stem section 30 integrally extending from the mouth section 29 in an axial direction. An axial end of the intermediate shaft 22 is press-fitted to the inner joint member 26, and is coupled by spline fitting so as to allow torque transmission therebetween.

A bellows-like boot 31 made of a resin is mounted between the outer joint member 24 of the constant velocity universal joint 6 and the intermediate shaft 22 so as to prevent leakage of a lubricant such as grease filled inside the joint, and to prevent entry of foreign matter from outside the joint, thereby attaining a structure of closing an opening portion of the outer joint member 24 with the boot 31.

The boot 31 comprises a large-diameter end portion 33 fixed to an outer circumferential surface of the outer joint member 24 by fastening with a boot band 32, a small-diameter end portion 35 fixed to an outer circumferential surface of the intermediate shaft 22 by fastening with a boot band 34, and a flexible bellows portion 36 connecting the large-diameter end portion 33 and the small-diameter end portion 35 and being reduced in diameter in a range of from the large-diameter end portion 33 toward the small-diameter end portion 35.

In this bearing device for a wheel, a columnar fitting surface 61 is formed on an outer circumferential surface of the stem section 30 of the outer joint member 24 on the inboard side, and a male spline comprising a plurality of convex portions 37 extending in the axial direction is formed on an outer circumferential surface of the stem section 30 on the outboard side. On the other hand, a cylindrical fitting surface 62 is formed on an inner circumferential surface of a shaft hole 38 of the hub wheel 1 on the inboard side, and a plurality of concave portions 39 each having an interference with only circumferential side wall portions 47 (see FIG. 9B) of corresponding one of the above-mentioned convex portions 37 are formed on an inner circumferential surface of the shaft hole 38 on the outboard side. Note that, the above-mentioned convex portions 37 are formed into a tooth profile with a trapezoidal cross section, but may be formed into an involute tooth profile.

Figure 3:
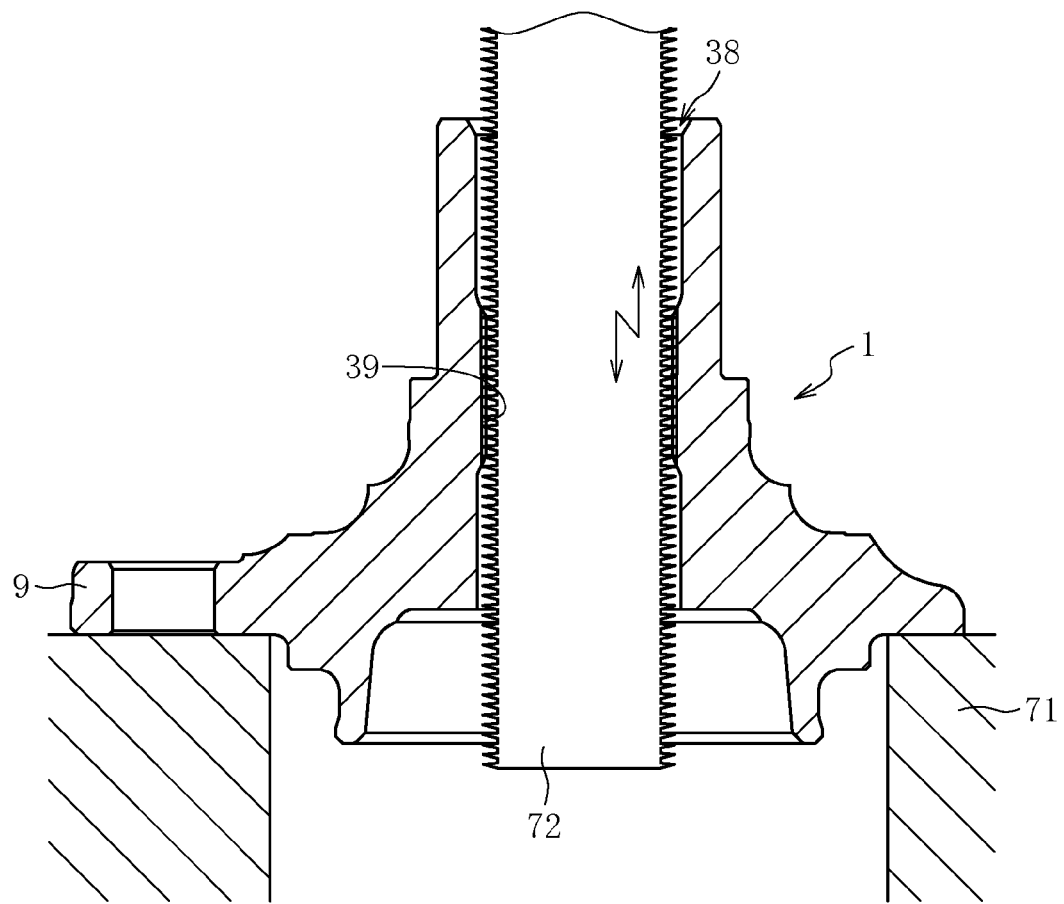
FIG. 3 is a sectional view illustrating a state in which a hub wheel alone is broached.
Figure 4:
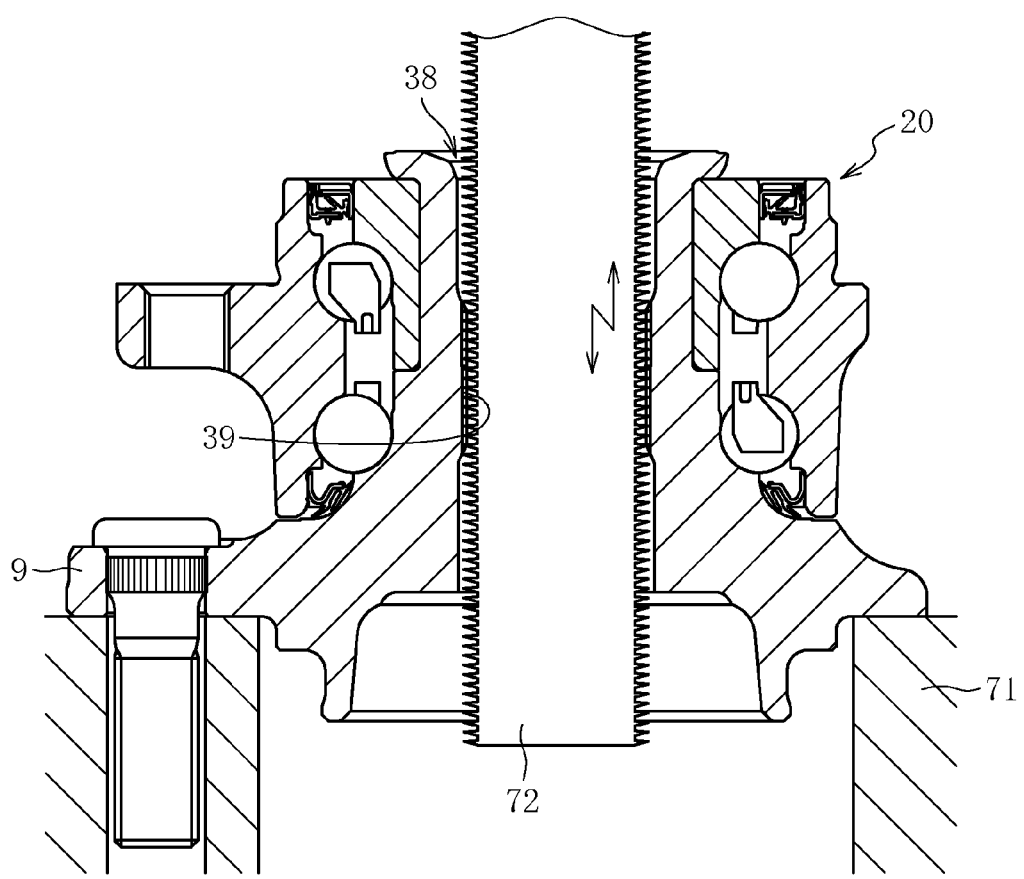
FIG. 4 is a sectional view illustrating a state in which the bearing for a wheel is broached.
Figure 20:
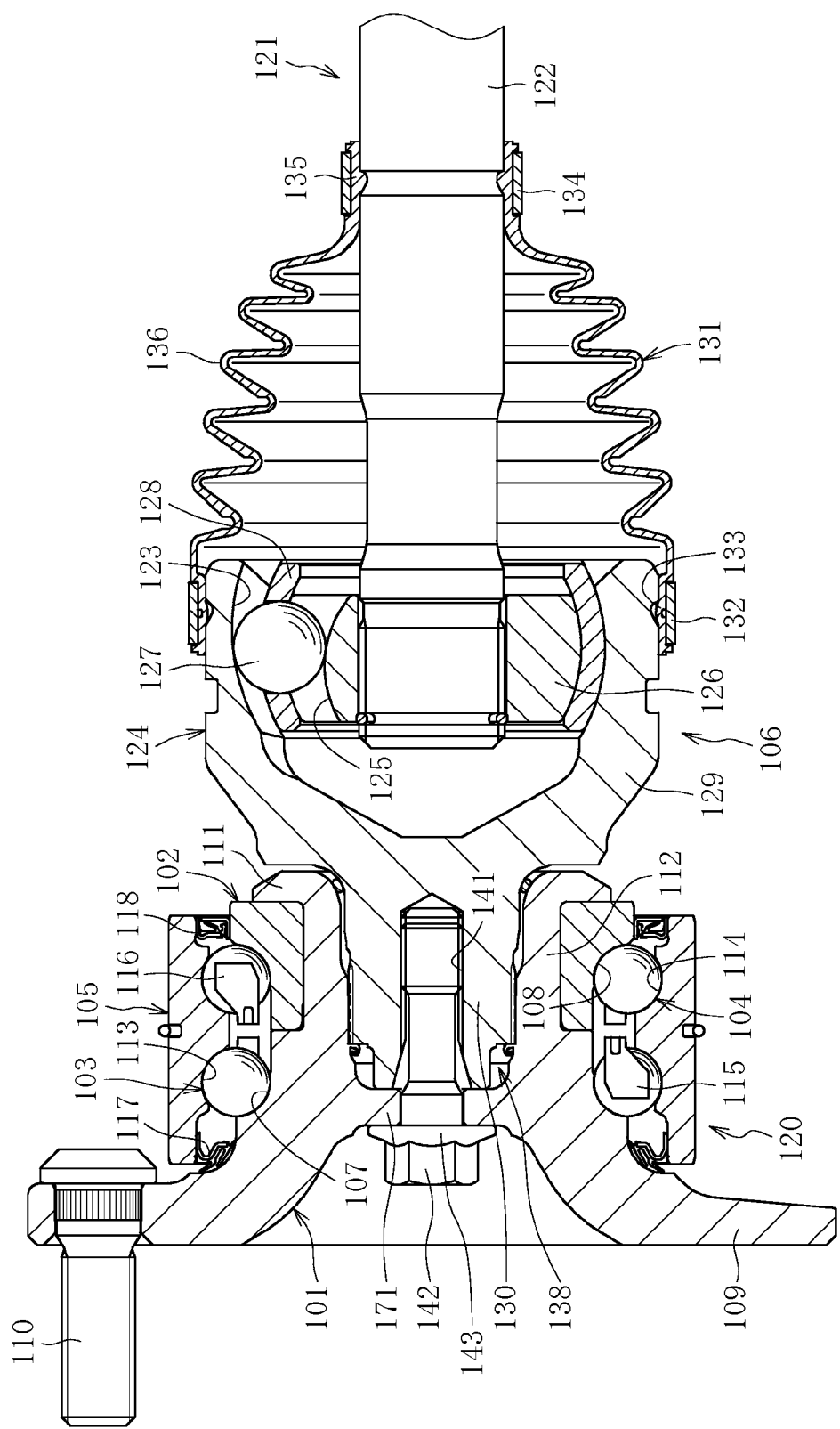
FIG. 20 is a vertical sectional view illustrating an overall structure of a related-art bearing device for a wheel.

The plurality of concave portions 39 extending in the axial direction are formed by broaching on the inner circumferential surface of the shaft hole 38 of the hub wheel 1 on the outboard side. The hub wheel 101 of the related-art bearing device for a wheel (see FIG. 20) has a structure in which a projecting wall portion 171 is formed at an opening end of the shaft hole 138 on the outboard side. In contrast, the hub wheel 1 of this embodiment (see FIG. 1) has a structure in which the shaft hole 38 is formed by penetrating the hub wheel 1 into a cylindrical shape over the axial direction without forming the projecting wall portion 171 unlike the related-art hub wheel 101. That is, the inner circumferential surface of the shaft hole 38 has such a cylindrical shape that the inner diameter is uniform over the axial direction. With the above-mentioned structure in which the shaft hole 38 is formed by penetrating the hub wheel 1 into a cylindrical shape so that the inner diameter of the inner circumferential surface of the shaft hole 38 is uniform over the axial direction, the concave portions 39 extending in the axial direction can be formed by broaching. As a result, the concave portions 39 each having an interference with only the circumferential side wall portions 47 of the corresponding convex portion 37 can easily be formed on the shaft hole 38 of the hub wheel 1 in advance, thereby achieving cost reduction. FIG. 3 illustrates a case where the hub wheel 1 alone is broached, and FIG. 4 illustrates a case where the bearing 20 for a wheel is broached. In the broaching, as illustrated in FIGS. 3 and 4, under a state in which the wheel mounting flange 9 of the hub wheel 1 is placed, positioned, and fixed on a base 71, a processing jig 72 is inserted into the shaft hole 38 of the hub wheel 1 and moved up and down in the axial direction of the hub wheel 1 so that the plurality of concave portions 39 extending in the axial direction are formed in the inner circumferential surface of the shaft hole 38 of the hub wheel 1. In the case where the hub wheel 1 is broached (see FIG. 3), there is an advantage in that post-processes such as washing are facilitated. In the case where the bearing 20 for a wheel is broached (see FIG. 4), on the other hand, the plurality of concave portions 39 are formed after an axial end of the bearing 20 for a wheel is crimped, and hence there is an advantage in that the plurality of concave portions 39 can be formed with higher accuracy.

Figure 9A:
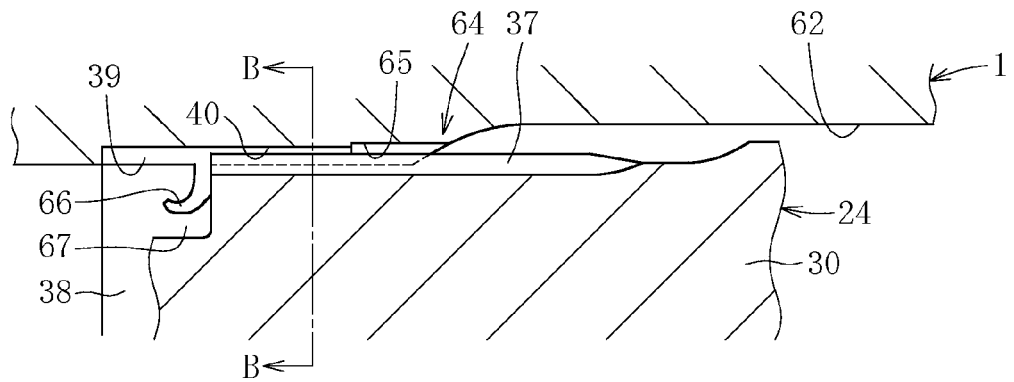
FIG. 9A is an enlarged main part sectional view illustrating a state in the middle of press-fitting the stem section of the outer joint member to the hub wheel of the bearing for a wheel in the embodiment in which the concave portions are each formed so as to have an interference with only the circumferential side wall portions of the corresponding convex portion.
Figure 9B:
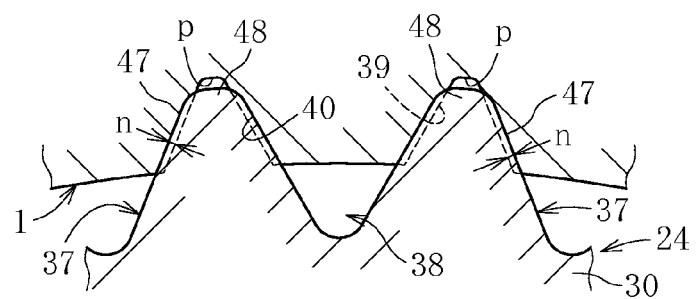
FIG. 9B is a sectional view taken along the line B-B of FIG. 9A.
Figure 10A:
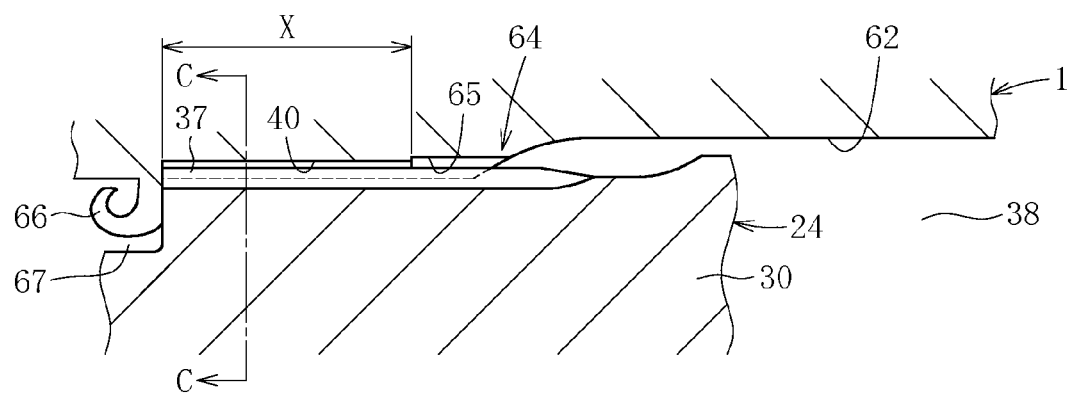
FIG. 10A is an enlarged main part sectional view illustrating a state after press-fitting the stem section of the outer joint member to the hub wheel of the bearing for a wheel in the embodiment in which the concave portions are each formed so as to have an interference with only the circumferential side wall portions of the corresponding convex portion.
Figure 10B:
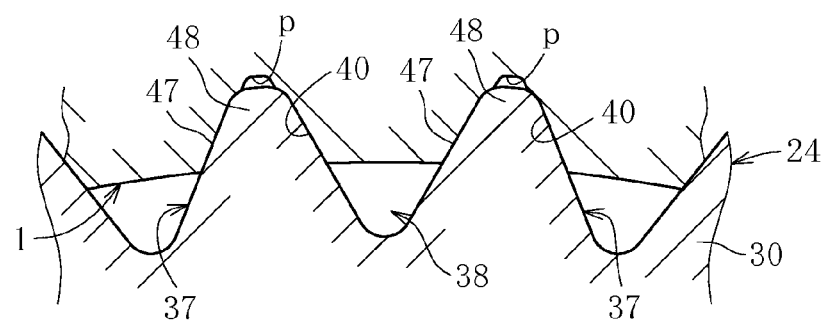
FIG. 10B is a sectional view taken along the line C-C of FIG. 10A.

In this bearing device for a wheel, the stem section 30 of the outer joint member 24 is press-fitted to the shaft hole 38 of the hub wheel 1, and the shapes of only the circumferential side wall portions 47 of the corresponding convex portions 37 are transferred to the shaft hole 38 of the hub wheel 1 being a mating surface on which the concave portions are formed, to thereby form concave portions 40 (see FIGS. 9B and 10B). Thus, there is defined a convex and concave fitting structure M in which the convex portions 37 and the concave portions 40 are brought into close contact with each other at an entire fitting contact portion X therebetween (see FIG. 2). Note that, it is preferred that materials for the outer joint member 24 and the hub wheel 1 be medium carbon steel for a machine structure as typified by S53C.

This bearing device for a wheel comprises the following screw fastening structure N (see FIG. 2). This screw fastening structure N comprises a female thread portion 41 formed at an axial end of the stem section 30 of the outer joint member 24, and a bolt 42 serving as a male thread portion to be locked on the hub wheel 1 in a state of being threadedly engaged with the female thread portion 41. In this structure, the bolt 42 is threadedly engaged with the female thread portion 41 of the stem section 30, and is fastened in a state of being locked on the hub wheel 1, to thereby fix the constant velocity universal joint 6 to the hub wheel 1. Note that, the bearing 20 for a wheel has a structure in which the inner race 2 is retained by the crimped portion 11 and integrated with the hub wheel 1 and the crimped portion 11 is brought into abutment against a shoulder portion 46 of the outer joint member 24. Thus, the bearing 20 for a wheel is separable from the outer joint member 24 of the constant velocity universal joint 6. In this case, with the above-mentioned structure in which the shaft hole 38 of the hub wheel 1 is formed by penetrating the hub wheel 1 into a cylindrical shape over the axial direction, the head of the bolt 42 has a bearing surface 43 with a larger diameter than that of a bearing surface 143 of the head of the bolt 142 in the related-art bearing device for a wheel (see FIG. 20), thereby achieving a structure in which the bolt 42 is locked on a circumferential edge portion of an opening end of the shaft hole 38 on the outboard side.

In this bearing device for a wheel, the fixed type constant velocity universal joint 6 to be coupled to the bearing 20 for a wheel comprising the hub wheel 1, the inner race 2, the double-row rolling elements 3 and 4, and the outer race 5 corresponds to a part of the drive shaft 21. It is necessary that the drive shaft 21 for transmitting power from an engine of an automobile to a wheel thereof be adaptable to angular displacement and axial displacement caused by a change in relative positional relationship between the engine and the wheel. Therefore, as in the structure illustrated in FIG. 5, a plunging type constant velocity universal joint 51 and the fixed type constant velocity universal joint 6 are generally installed on the engine side (inboard side) and the wheel side (outboard side), respectively, and both the constant velocity universal joints 6 and 51 are coupled to each other through intermediation of the intermediate shaft 22.

In the case of this bearing device for a wheel, the concave portions 39 each having an interference with only the circumferential side wall portions 47 (see FIG. 9B) of the corresponding convex portion 37 are formed in advance. Thus, the press-fitting load for bringing the convex portions 37 and the concave portions 40 into close contact with each other at the entire fitting contact portion X therebetween can be reduced as compared to the related art in which the shape of each convex portion 137 is transferred to the cylindrical portion 139 (see FIG. 21). As a result, at the time of assembling a vehicle in an automobile manufacturer, after the bearing 20 for a wheel is fixed with the bolts 63 to the knuckle 52 extending from the suspension device of the vehicle body, the stem section 30 of the outer joint member 24 of the constant velocity universal joint 6 can be press-fitted to the shaft hole 38 of the hub wheel 1 of the bearing 20 for a wheel with a pull-in force generated by the bolt 42 of the screw fastening structure N, with the result that the constant velocity universal joint 6 of the drive shaft 21 can be mounted to the bearing 20 for a wheel in a simple way.

Figure 6:
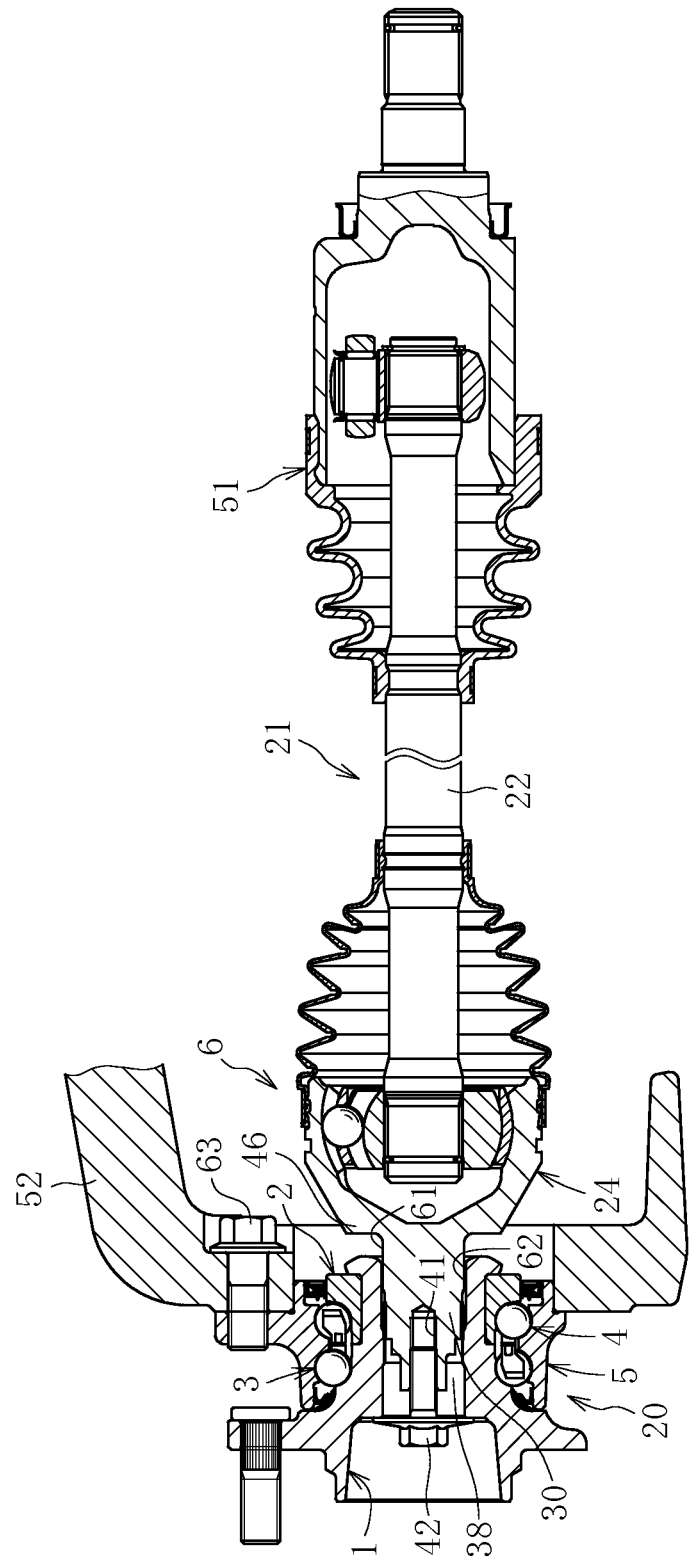
FIG. 6 is a sectional view illustrating a state in the middle of mounting the constant velocity universal joint of the drive shaft to the bearing for a wheel, which is mounted to the knuckle.

Note that, as illustrated in FIG. 6, prior to press-fitting the stem section 30 of the outer joint member 24 to the shaft hole 38 of the hub wheel 1, the columnar fitting surface 61 is formed on the outer circumferential surface of the stem section 30 on the inboard side, and the cylindrical fitting surface 62 is formed on the inner circumferential surface of the shaft hole 38 of the hub wheel 1 on the inboard side. Thus, the axial alignment of the stem section 30 with the hub wheel 1 can easily be carried out by fitting the fitting surface 61 of the stem section 30 to the fitting surface 62 of the shaft hole 38 of the hub wheel 1.

Figure 8A:
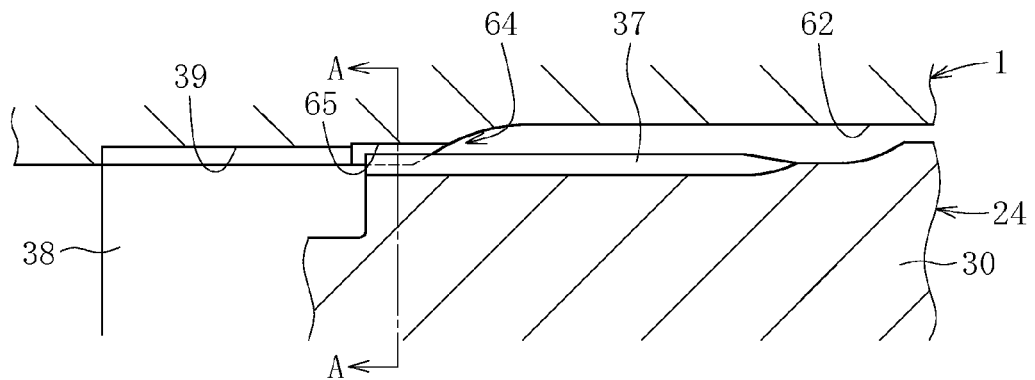
FIG. 8A is an enlarged main part sectional view illustrating a state before press-fitting a stem section of an outer joint member to the hub wheel of the bearing for a wheel in an embodiment in which concave portions are each formed so as to have an interference with only circumferential side wall portions of a corresponding convex portion.
Figure 8B:
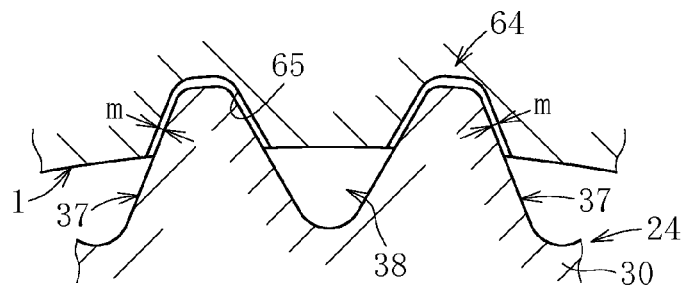
FIG. 8B is a sectional view taken along the line A-A of FIG. 8A.

Further, as illustrated in FIGS. 8A and 8B, a guide portion 64 for guiding the start of press fitting is formed between the fitting surface 62 positioned on the inboard side of the hub wheel 1 and the concave portions 39 positioned on the outboard side thereof. The guide portion 64 comprises a plurality of concave portions 65 formed so as to extend in the axial direction with the same phases as those of the concave portions 39. The concave portions 65 are relatively larger than the convex portions 37 of the stem section 30 (see the enlarged portion of FIG. 1). That is, gaps m are formed between the convex portions 37 and the concave portions 65 (see FIG. 8B). The guide portion 64 can guide the stem section 30 of the outer joint member 24 to be press-fitted to the hub wheel 1 so that the convex portions 37 of the stem section 30 are reliably press-fitted to the concave portions 39 of the hub wheel 1. Thus, stable press fitting can be carried out to prevent axial misalignment, axial inclination, and the like at the time of press fitting. Note that, the guide portion 64 comprises the concave portions 65 larger than the concave portions 39 positioned on the outboard side, and hence the concave portions 65 cannot be formed by broaching unlike the concave portions 39 positioned on the outboard side. Therefore, the concave portions 65 of the guide portion 64 are formed by press working. After the concave portions 65 of the guide portion 64 are formed, the concave portions 39 positioned on the outboard side are formed by broaching.

In this case, as illustrated in FIGS. 9A and 9B, the circumferential dimension of the above-mentioned concave portion 39 is set smaller than that of the convex portion 37 so that the concave portion 39 may have an interference n with only the circumferential side wall portions 47 of the convex portion 37. Further, a portion except for the circumferential side wall portions 47 of the convex portion 37, that is, a radial tip end portion 48 of the convex portion 37 does not have the interference with the concave portion 39. Therefore, the radial dimension of the concave portion 39 is set larger than that of the convex portion 37, and thus the concave portion 39 has a clearance p from the radial tip end portion 48 of the convex portion 37.

Figure 21:
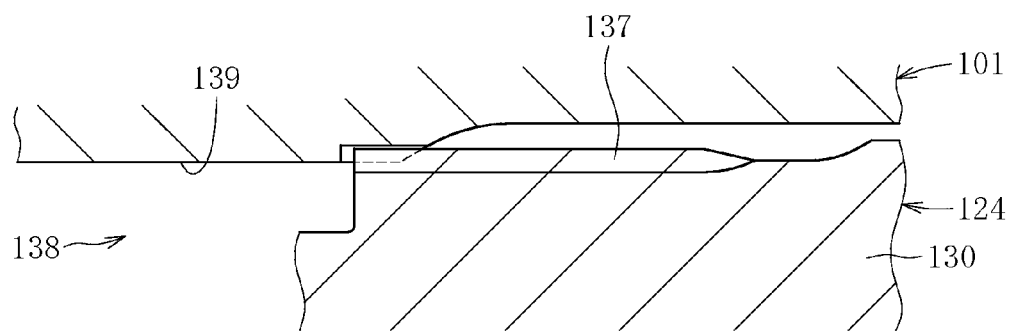
FIG. 21 is an enlarged main part vertical sectional view illustrating a state before press-fitting a stem section of an outer joint member to a shaft hole of a hub wheel in the bearing device for a wheel of FIG. 20.
Figure 22:
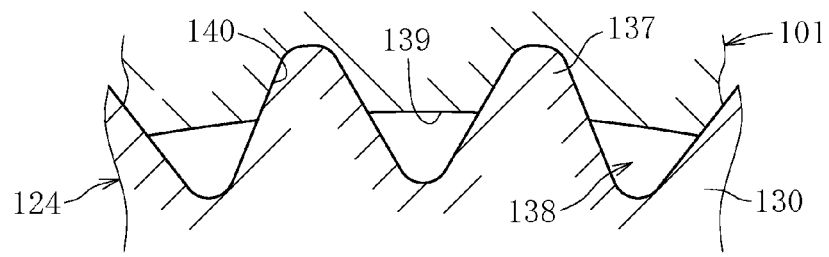
FIG. 22 is an enlarged main part lateral sectional view illustrating a state after press-fitting the stem section of the outer joint member to the shaft hole of the hub wheel in the bearing device for a wheel of FIG. 20.
Figure 23:
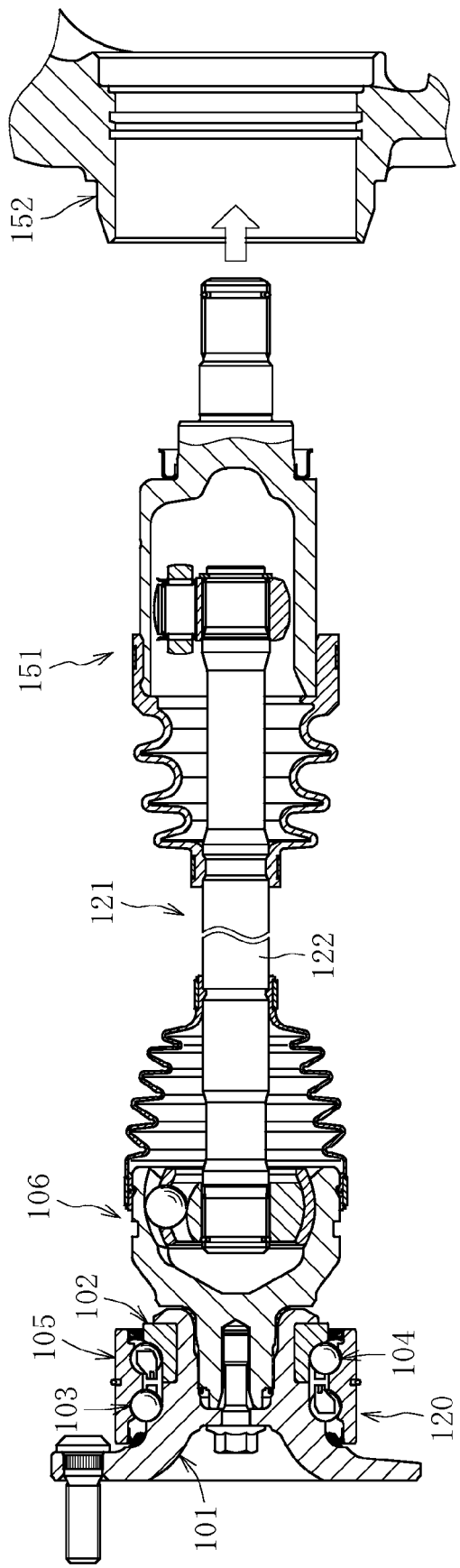
FIG. 23 is a sectional view illustrating a state before mounting, to a knuckle, a bearing device for a wheel having a drive shaft mounted thereto.
Figure 24:
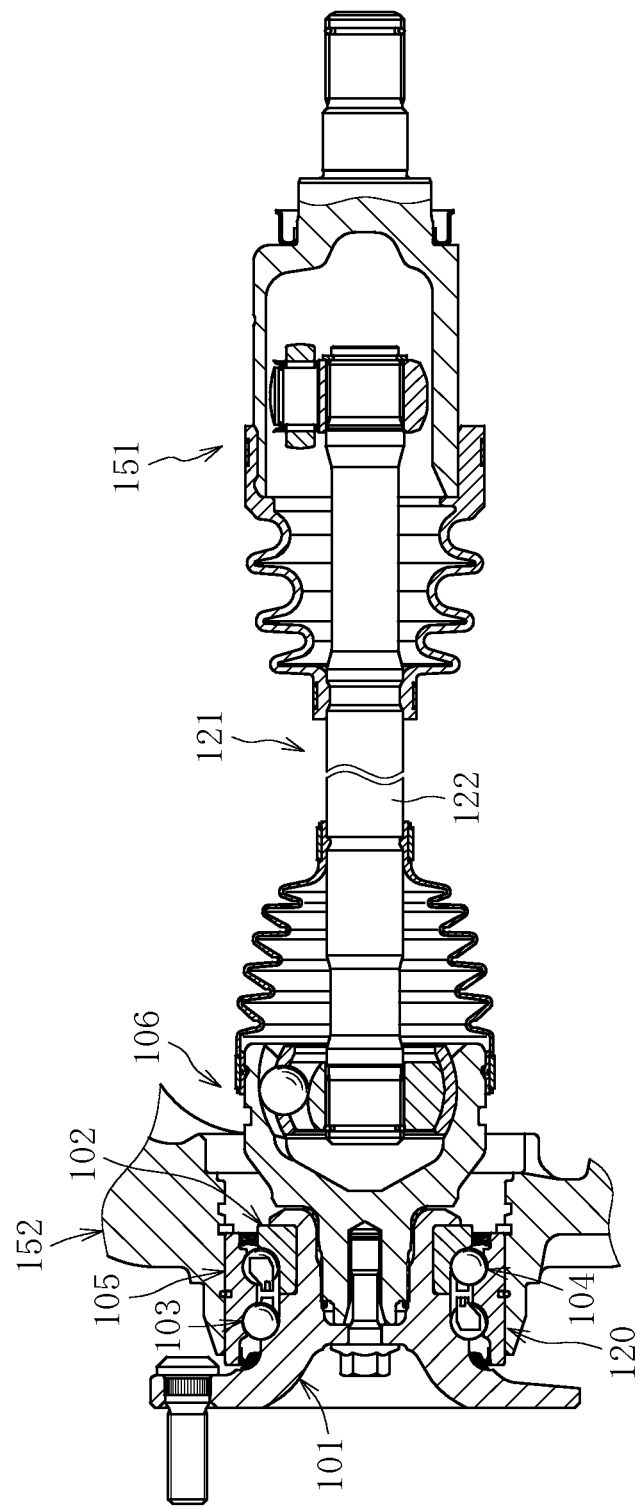
FIG. 24 is a sectional view illustrating a state after mounting, to the knuckle, the bearing device for a wheel having the drive shaft mounted thereto.

When the concave portions 40 are formed as illustrated in FIGS. 10A and 10B by transferring the shapes of only the circumferential side wall portions 47 of the convex portions 37 to the shaft hole 38 of the hub wheel 1 through the press fitting of the stem section 30 to the hub wheel 1, due to the structure in which the concave portions 39 each having the interference n with only the circumferential side wall portions 47 of the corresponding convex portion 37, that is, the concave portions 39 each having a circumferential dimension set smaller than that of the corresponding convex portion 37 are formed in advance, the press-fitting load for bringing the convex portions 37 and the concave portions 40 into close contact with each other at the entire fitting contact portion X therebetween (see FIG. 2) can be reduced as compared to the related art in which the shape of each convex portion 137 is transferred to the cylindrical portion 139 (see FIG. 21). Note that, the radial tip end portion 48 of each convex portion 37 does not have any interference with the corresponding concave portion 39, and hence the shape of the radial tip end portion 48 of the convex portion 37 is not transferred to the concave portion 39.

Figure 7:
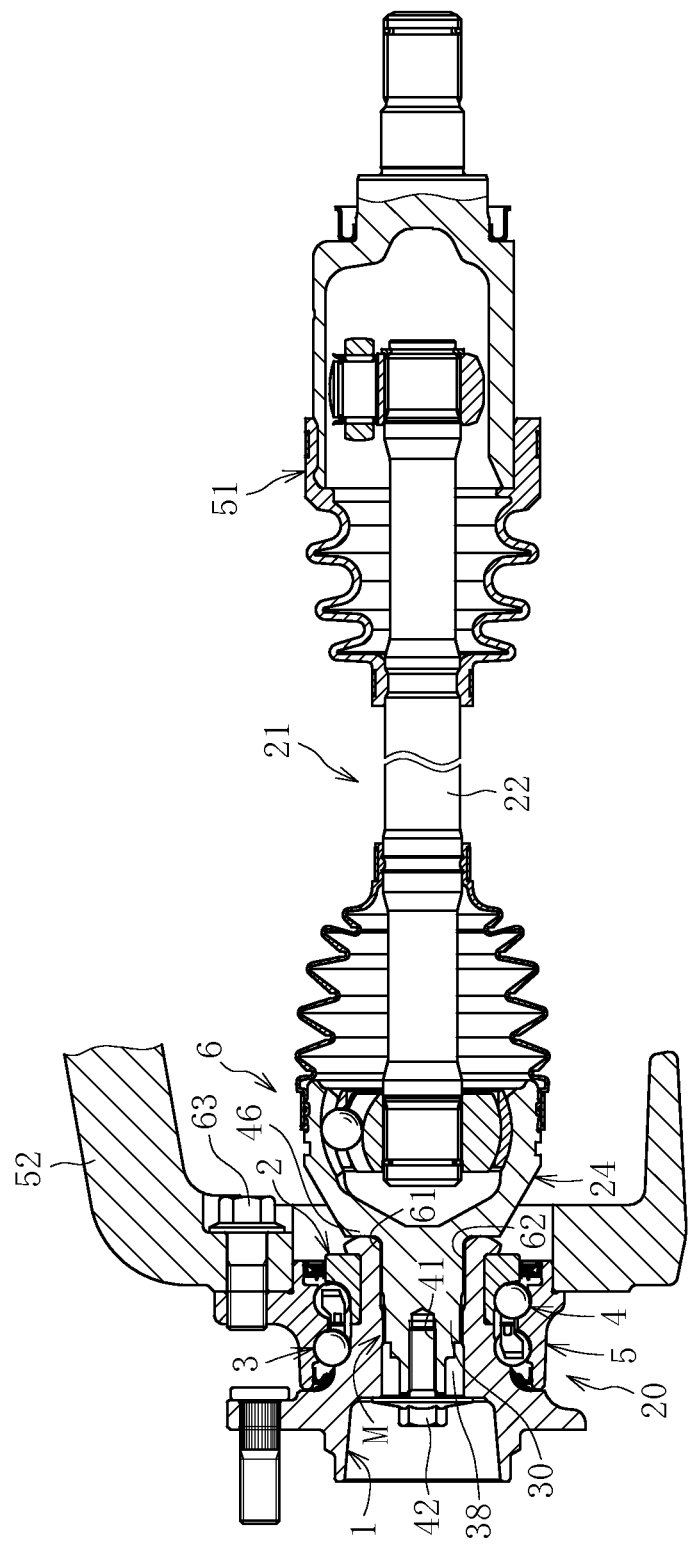
FIG. 7 is a sectional view illustrating a state after mounting the constant velocity universal joint of the drive shaft to the bearing for a wheel, which is mounted to the knuckle.

As a result, as illustrated in FIG. 7, the outer joint member 24 can be press-fitted to the hub wheel 1 with a force that is equal to or smaller than an axial force generated by fastening the bolt 42. That is, after the bearing 20 for a wheel is mounted to the knuckle 52 of the vehicle body, the outer joint member 24 can easily be press-fitted to the hub wheel 1 of the bearing 20 for a wheel with the pull-in force generated by the bolt 42, with the result that the constant velocity universal joint 6 can easily be coupled to the bearing 20 for a wheel. Thus, the workability can be enhanced when mounting the bearing 20 for a wheel to the vehicle body, and the damage to the components can be forestalled at the time of mounting the bearing 20 for a wheel.

As described above, there is no need to separately prepare a dedicated jig when press-fitting the outer joint member 24 to the hub wheel 1 of the bearing 20 for a wheel after the bearing 20 for a wheel is mounted to the knuckle 52 of the vehicle body. Instead, the constant velocity universal joint 6 can be coupled, in a simple way, to the bearing 20 for a wheel with the bolt 42 that is a component of the bearing device for a wheel. Further, the outer joint member 24 can be press-fitted by applying the relatively small pull-in force, which is equal to or smaller than the axial force generated by fastening the bolt 42, and hence the workability can be enhanced when pulling in the outer joint member 24 with the bolt 42. Still further, there is no need to apply a significant press-fitting load, and hence the damage to (collapse of) the convex and concave portions can be prevented in the convex and concave fitting structure M, with the result that a high-quality and long-life convex and concave fitting structure M can be realized.

When press-fitting the stem section 30 of the outer joint member 24 to the shaft hole 38 of the hub wheel 1, the surface on which the concave portion is formed is cut by an extremely small amount due to the circumferential side wall portions 47 of each convex portion 37, to thereby transfer the shapes of the circumferential side wall portions 47 of the convex portion 37 to the surface on which the concave portion is formed while concomitantly causing extremely small plastic or elastic deformation of the surface on which the concave portion is formed due to the circumferential side wall portions 47 of the convex portion 37. At this time, the circumferential side wall portions 47 of the convex portion 37 dig into the surface on which the concave portion is formed, thereby leading to a state in which the inner diameter of the hub wheel 1 is slightly increased. Thus, relative movement of the convex portion 37 in the axial direction is allowed. When the relative movement of the convex portion 37 in the axial direction is stopped, the diameter of the shaft hole 38 of the hub wheel 1 is reduced so as to recover the original diameter. Consequently, the convex portion 37 and the concave portion 40 are brought into close contact with each other at the entire fitting contact portion X therebetween, with the result that the outer joint member 24 and the hub wheel 1 can firmly be coupled to and integrated with each other.

Through the coupling thus carried out at low cost with high reliability, any gap that may cause a backlash is not formed in the radial direction and the circumferential direction of the fitting portion between the stem section 30 and the hub wheel 1, and hence the entire fitting contact portion X contributes to rotational torque transmission, thereby being capable of achieving stable torque transmission. As a result, annoying gear rattling noise can be prevented over a long period of time. The stem section 30 and the hub wheel 1 are thus brought into close contact with each other at the entire fitting contact portion X therebetween, and hence the strength of the torque transmitting portion is enhanced. As a result, the bearing device for a vehicle is light-weighted and downsized.

When press-fitting the stem section 30 of the outer joint member 24 to the shaft hole 38 of the hub wheel 1, the surface hardness of the convex portion 37 is set higher than the surface hardness of the concave portion 39. In this case, the difference between the surface hardness of the convex portion 37 and the surface hardness of the concave portion 39 is set equal to or larger than 20 HRC. Thus, through the plastic deformation and the cutting work at the time of press fitting, the shapes of the circumferential side wall portions 47 of the convex portion 37 can easily be transferred to the mating surface on which the concave portion is formed. Note that, it is preferred that the surface hardness of the convex portion 37 be 50 to 65 HRC, and that the surface hardness of the concave portion 39 be 10 to 30 HRC.

An accommodating portion 67 for accommodating a flash portion 66 generated due to the transfer of the shapes of the convex portions through the press fitting is formed between the shaft hole 38 of the hub wheel 1 and the stem section 30 of the outer joint member 24 (see FIGS. 9A and 10A). Thus, the flash portion 66 generated due to the transfer of the shapes of the convex portions through the press fitting can be kept in the accommodating portion 67, thereby being capable of inhibiting the flash portion 66 from entering, for example, the inside of the vehicle that is located outside the device. With the structure in which the flash portion 66 is kept in the accommodating portion 67, the process of removing the flash portion 66 becomes unnecessary so that the number of working steps can be reduced. As a result, the workability can be enhanced and the cost can be reduced.

Note that, the above-mentioned embodiment is directed to the case where the concave portion 39 is set so as to have the interference n with only the circumferential side wall portions 47 (see FIG. 9B) of the corresponding convex portion 37, but the present invention is not limited thereto. As in an embodiment illustrated in FIGS. 11A, 11B, 12A, 12B, 13A, and 13B, the concave portion 39 may be set so as to have the interference n with a portion including the radial tip end portion 48 of the corresponding convex portion 37 as well as the circumferential side wall portions 47 thereof, that is, in a region from mountain-slope portions of the convex portion 37 to a mountain-peak portion thereof. Thus, the concave portion 39 is set smaller than the convex portion 37 so that the entire concave portion 39 has the interference n with the circumferential side wall portions 47 and the radial tip end portion 48 of the convex portion 37. That is, the circumferential dimension and the radial dimension of the concave portion 39 only need to be set smaller than those of the convex portion 37 so as to set the concave portion 39 smaller than the convex portion 37.

Figure 11A:
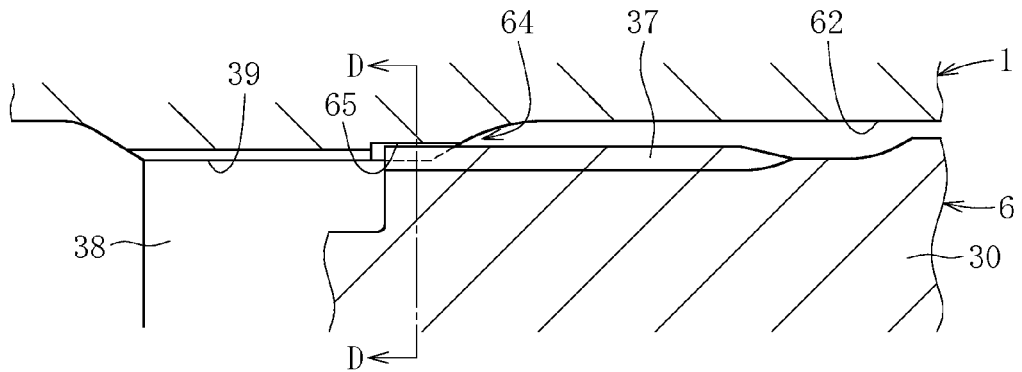
FIG. 11A is an enlarged main part sectional view illustrating a state before press-fitting the stem section of the outer joint member to the hub wheel of the bearing for a wheel in an embodiment in which the concave portions are each formed so as to have an interference with the circumferential side wall portions and a radial tip end portion of the corresponding convex portion.
Figure 11B:
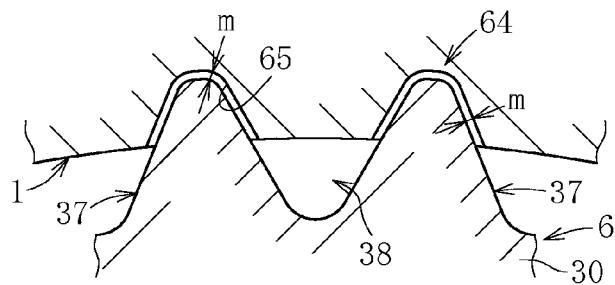
FIG. 11B is a sectional view taken along the line D-D of FIG. 11A.
Figure 12A:
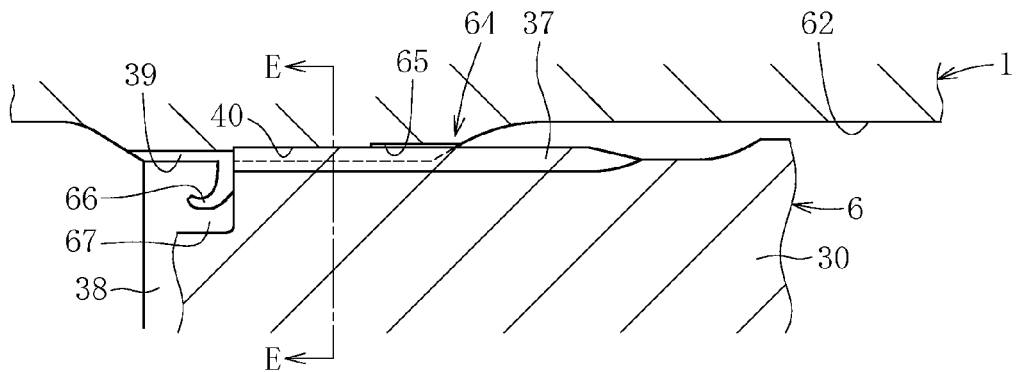
FIG. 12A is an enlarged main part sectional view illustrating a state in the middle of press-fitting the stem section of the outer joint member to the hub wheel of the bearing for a wheel in the embodiment in which the concave portions are each formed so as to have an interference with the circumferential side wall portions and the radial tip end portion of the corresponding convex portion.
Figure 12B:
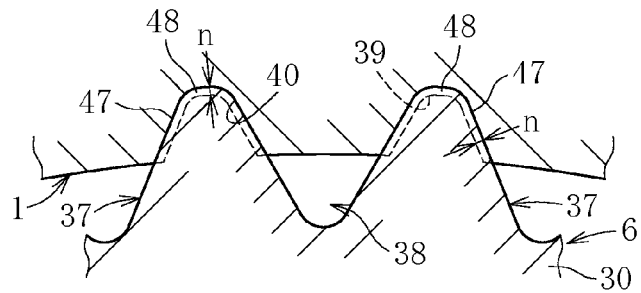
FIG. 12B is a sectional view taken along the line E-E of FIG. 12A.
Figure 13A:
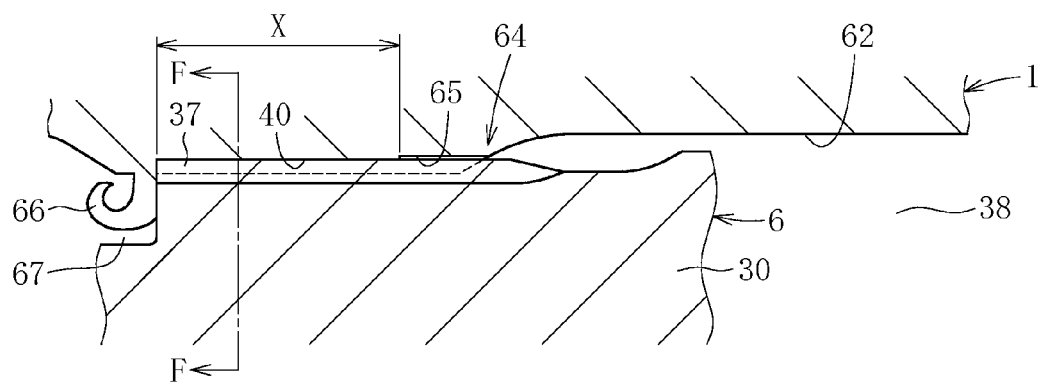
FIG. 13A is an enlarged main part sectional view illustrating a state after press-fitting the stem section of the outer joint member to the hub wheel of the bearing for a wheel in the embodiment in which the concave portions are each formed so as to have an interference with the circumferential side wall portions and the radial tip end portion of the corresponding convex portion.
Figure 13B:
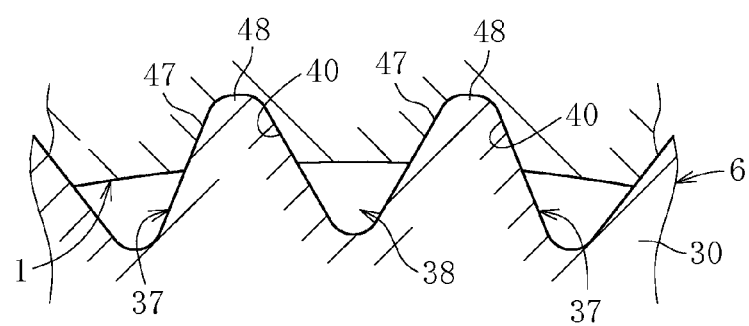
FIG. 13B is a sectional view taken along the line F-F of FIG. 13A.

Also in this embodiment, similarly to the embodiment illustrated in FIGS. 8A, 8B, 9A, 9B, 10A, and 10B, the guide portion 64 formed between the fitting surface 62 positioned on the inboard side of the hub wheel 1 and the concave portions 39 positioned on the outboard side thereof guides, as illustrated in FIGS. 11A and 11B, the stem section 30 of the outer joint member 24 to be press-fitted to the hub wheel 1 so that the convex portions 37 of the stem section 30 are reliably press-fitted to the concave portions 39 of the hub wheel 1. Then, the surface on which the concave portion is formed is cut by an extremely small amount due to the circumferential side wall portions 47 and the radial tip end portion 48 of each convex portion 37 as illustrated in FIGS. 12A and 12B, to thereby transfer the shapes of the circumferential side wall portions 47 and the radial tip end portion 48 of the convex portion 37 to the surface on which the concave portion is formed while concomitantly causing extremely small plastic or elastic deformation of the surface on which the concave portion is formed due to the circumferential side wall portions 47 and the radial tip end portion 48 of the convex portion 37. At this time, the circumferential side wall portions 47 and the radial tip end portion 48 of the convex portion 37 dig into the surface on which the concave portion is formed, thereby leading to a state in which the inner diameter of the hub wheel 1 is slightly increased. Thus, the relative movement of the convex portion 37 in the axial direction is allowed. When the relative movement of the convex portion 37 in the axial direction is stopped, the diameter of the shaft hole 38 of the hub wheel 1 is reduced as illustrated in FIGS. 13A and 13B so as to recover the original diameter. Consequently, each concave portion 40 is formed on the shaft hole 38 of the hub wheel 1.

Note that, in the above-mentioned embodiment illustrated in FIGS. 8A, 8B, 9A, 9B, 10A, and 10B, the concave portion 39 is set so as to have the interference n with only the circumferential side wall portions 47 (see FIG. 9B) of the corresponding convex portion 37. In the embodiment illustrated in FIGS. 11A, 11B, 12A, 12B, 13A, and 13B, on the other hand, the concave portion 39 is set so as to have the interference n with the circumferential side wall portions 47 and the radial tip end portion 48 (see FIG. 12B) of the corresponding convex portion 37. As described above, according to the embodiment illustrated in FIGS. 8A, 8B, 9A, 9B, 10A, and 10B, in which the concave portion 39 is set so as to have the interference n with only the circumferential side wall portions 47 of the corresponding convex portion 37, the press-fitting load can be reduced as compared to the embodiment illustrated in FIGS. 11A, 11B, 12A, 12B, 13A, and 13B, in which the concave portion 39 is set so as to have the interference n with the circumferential side wall portions 47 and the radial tip end portion 48 of the corresponding convex portion 37.

Figure 14:
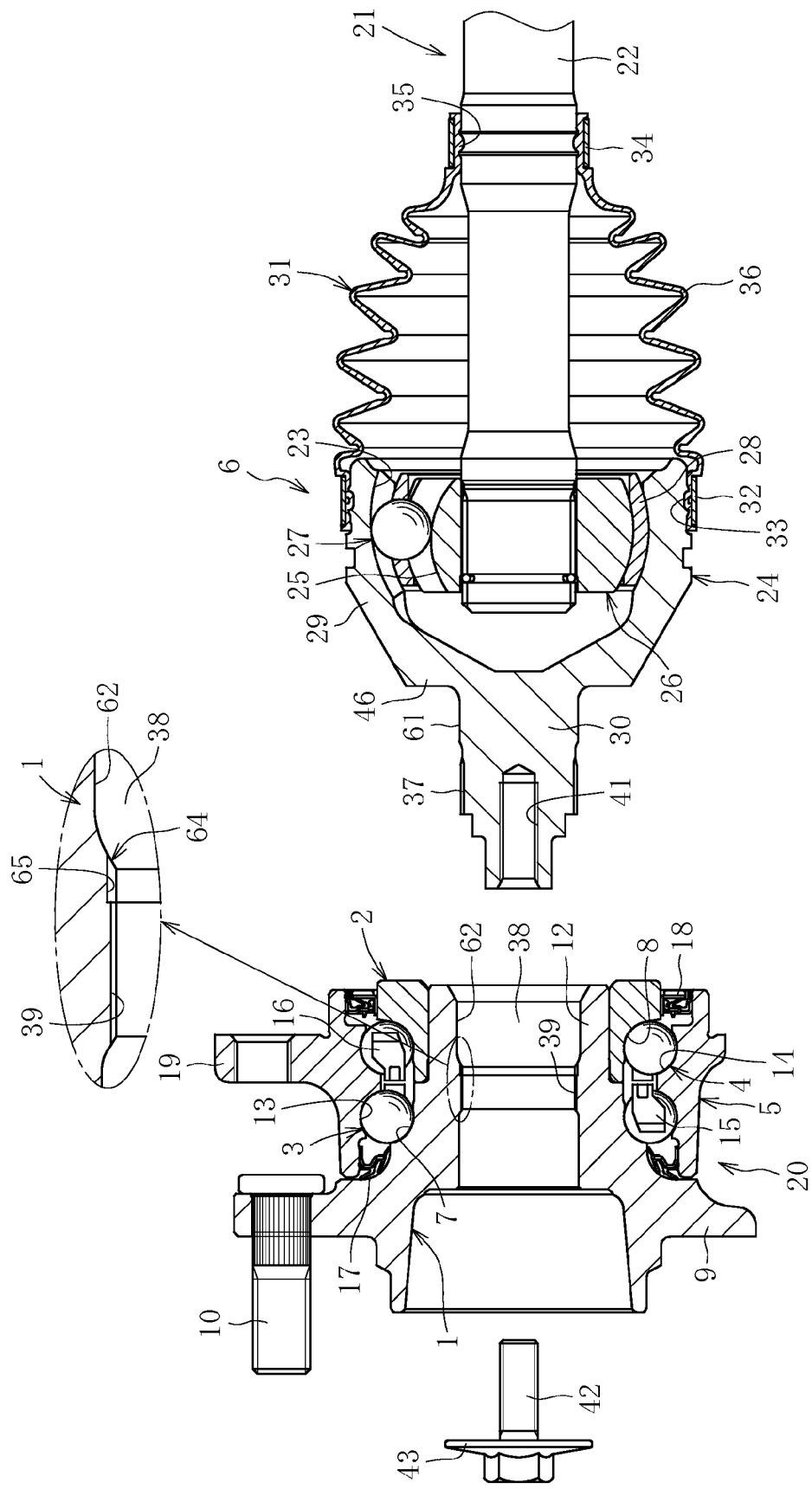
FIG. 14 is a sectional view illustrating a state before mounting the constant velocity universal joint to a bearing for a wheel having a non-crimping structure in a bearing device for a wheel according to another embodiment of the present invention.
Figure 15:
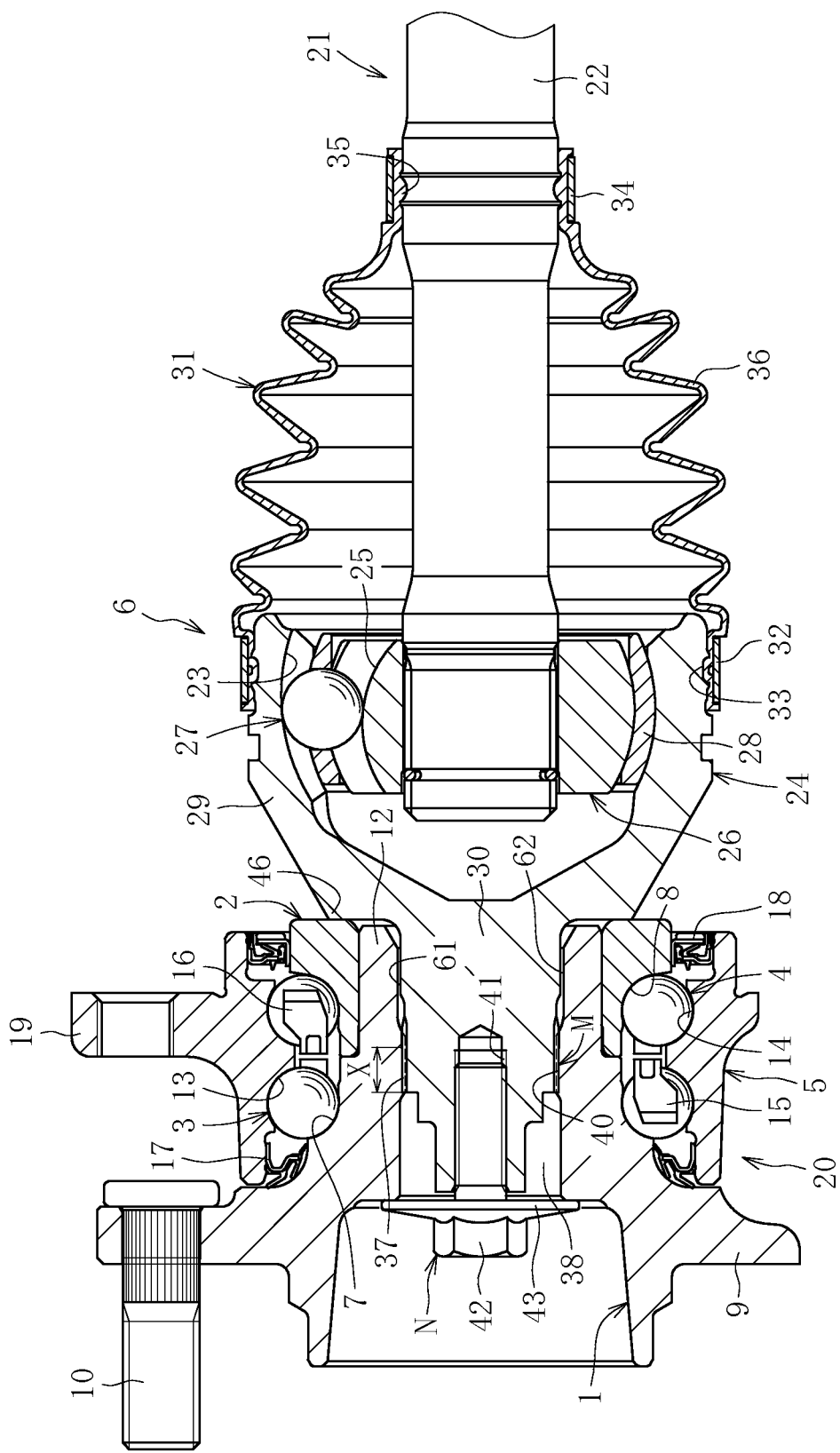
FIG. 15 is a sectional view illustrating a state after mounting the constant velocity universal joint to the bearing for a wheel of FIG. 14.

The embodiment illustrated in FIGS. 1 and 2 exemplifies the crimping structure in which the end portion of the small-diameter step portion 12 of the hub wheel 1 on the inboard side is crimped outward by orbital forming so that the inner race 2 is retained by the crimped portion 11 and integrated with the hub wheel 1, to thereby apply preload to the bearing 20 for a wheel. Alternatively, a non-crimping structure as illustrated in FIGS. 14 and 15 may be employed. FIG. 14 illustrates a state before mounting the constant velocity universal joint 6 to the bearing 20 for a wheel, and FIG. 15 illustrates a state after mounting the constant velocity universal joint 6 to the bearing 20 for a wheel. This embodiment provides a structure in which the inner race 2 is press-fitted to the small-diameter step portion 12 of the hub wheel 1 and the end surface of the inner race 2 is brought into abutment against the end surface of the shoulder portion 46 of the outer joint member 24. When this structure is employed, the weight can be reduced because the crimped portion 11 (see FIGS. 1 and 2) is omitted, and the cost can be reduced because the process involving orbital forming is unnecessary.

In this non-crimping structure, the bolt 42 is threadedly engaged with the female thread portion 41 of the stem section 30, to thereby apply preload to the bearing 20 for a wheel with the axial force generated by fastening the bolt 42. Thus, the use of a bolt 42 subjected to surface treatment with an axial force stabilizer is effective in that fluctuation in axial force with respect to the fastening torque of the bolt 42 can be reduced. The bolt 42 thus subjected to the axial force stabilizing treatment may also be used in the embodiment illustrated in FIGS. 1 and 2.

Note that, in the embodiment of FIGS. 14 and 15, other structural features such as the formation of the concave portions 39 on the shaft hole 38 of the hub wheel 1 by broaching and the lock of the head of the bolt 42 on the circumferential edge portion of the opening end of the shaft hole 38 of the hub wheel 1, a procedure of mounting the bearing 20 for a wheel to the suspension device of the vehicle body, and a procedure of mounting the constant velocity universal joint 6 of the drive shaft 21 to the bearing 20 for a wheel are similar to those in the embodiment of FIGS. 1 and 2, and hence identical or corresponding parts to those in FIGS. 1 and 2 are represented by the same reference symbols to omit redundant description thereof.

Figure 16:
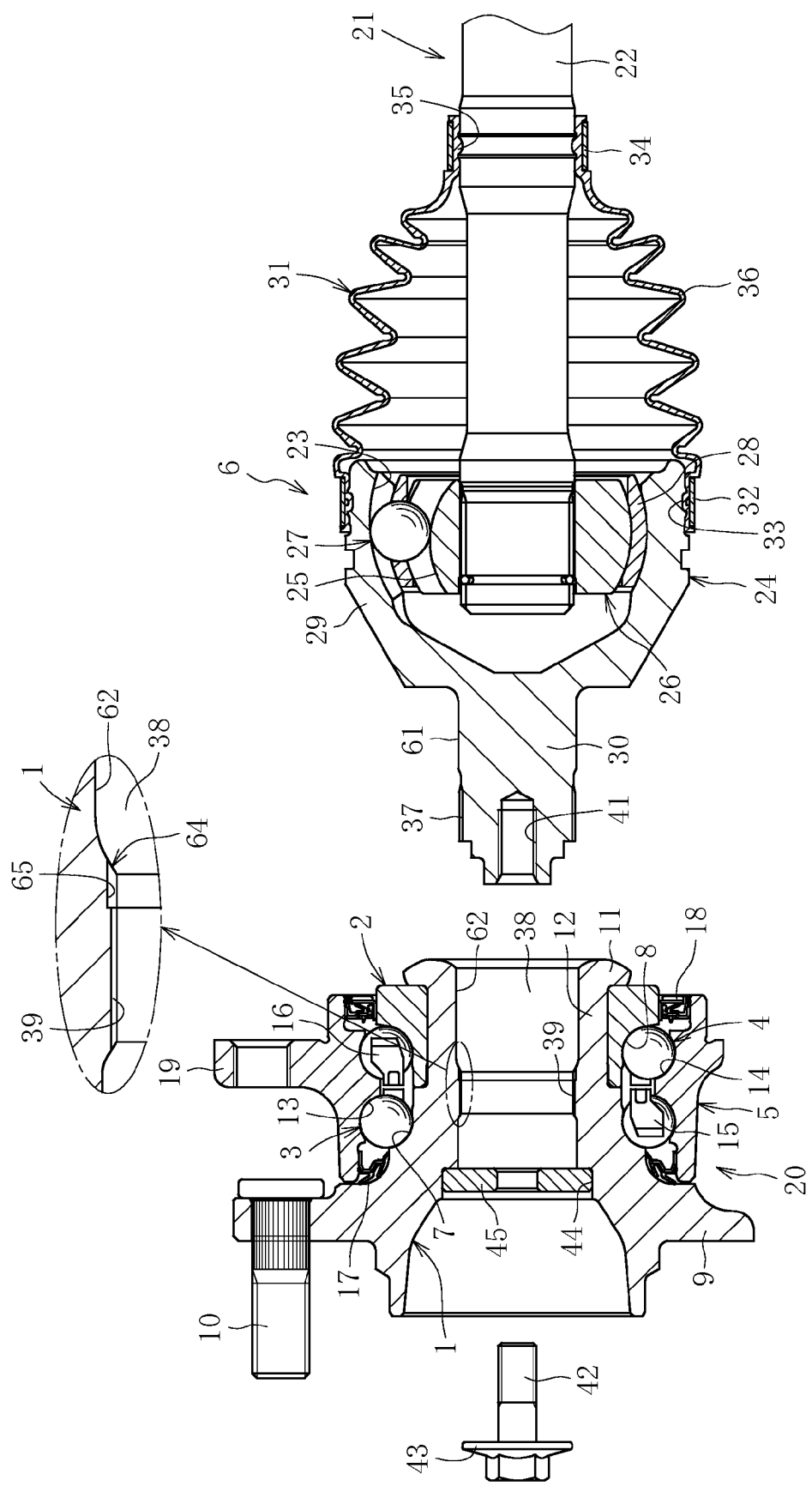
FIG. 16 is a sectional view illustrating a state before mounting the constant velocity universal joint to a bearing for a wheel having a crimping structure with an annular plate fitted into a shaft hole of a hub wheel in a bearing device for a wheel according to still another embodiment of the present invention.
Figure 17:
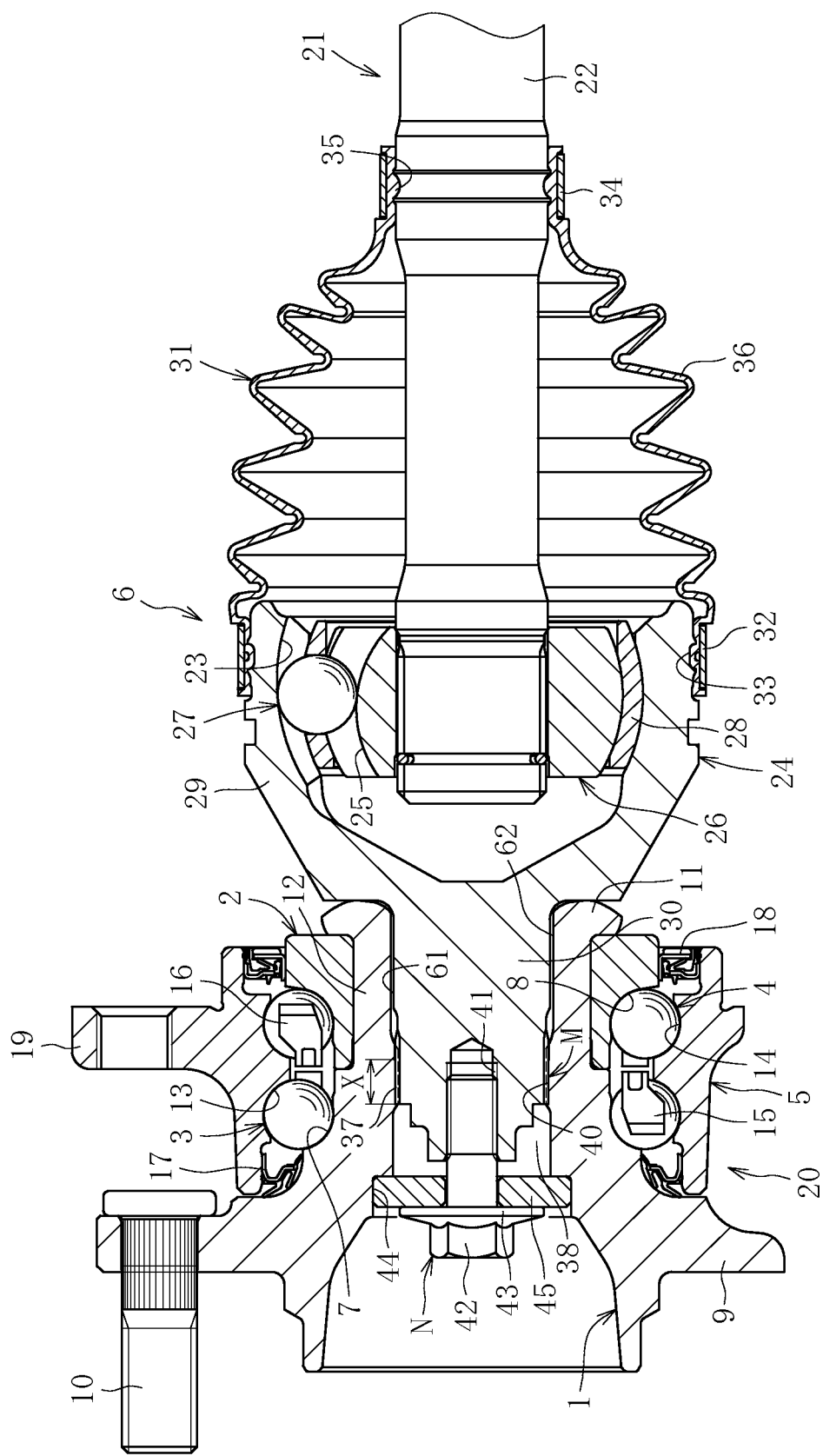
FIG. 17 is a sectional view illustrating a state after mounting the constant velocity universal joint to the bearing for a wheel of FIG. 16.

Further, the above-mentioned embodiments exemplify the structure in which the bolt 42 having the bearing surface 43 with a larger diameter than that of the related-art bolt 142 is locked on the circumferential edge portion of the opening end of the shaft hole 38 of the hub wheel 1. Alternatively, a screw fastening structure as illustrated in FIGS. 16 and 17 may be employed. FIG. 16 illustrates a state before mounting the constant velocity universal joint 6 to the bearing 20 for a wheel, and FIG. 17 illustrates a state after mounting the constant velocity universal joint 6 to the bearing 20 for a wheel. In the screw fastening structure of this embodiment, a recessed portion 44 having a larger diameter than the shaft hole 38 is formed at the opening end of the shaft hole 38 of the hub wheel 1, and an annular plate 45 is fitted to the recessed portion 44. In this structure, the head of the bolt 42 to be threadedly engaged with the female thread portion 41 of the stem section 30 is locked on the end surface of the annular plate 45. As described above, the annular plate 45 is fitted to the opening end of the shaft hole 38 of the hub wheel 1, which is formed by penetrating the hub wheel 1 into a cylindrical shape over the axial direction, and hence a head of a bolt having a bearing surface 43 with a smaller diameter than that of the bearing surface 43 of the bolt 42 in the above-mentioned embodiments (see FIGS. 1 and 2 and FIGS. 14 and 15) may be used as the head of the bolt 42.

Note that, in the embodiment of FIGS. 16 and 17, other structural features such as the formation of the concave portions 39 on the shaft hole 38 of the hub wheel 1 by broaching, a procedure of mounting the bearing 20 for a wheel to the suspension device of the vehicle body, and a procedure of mounting the constant velocity universal joint 6 of the drive shaft 21 to the bearing 20 for a wheel are similar to those in the embodiment of FIGS. 1 and 2, and hence identical or corresponding parts to those in FIGS. 1 and 2 are represented by the same reference symbols to omit redundant description thereof.

Figure 18:
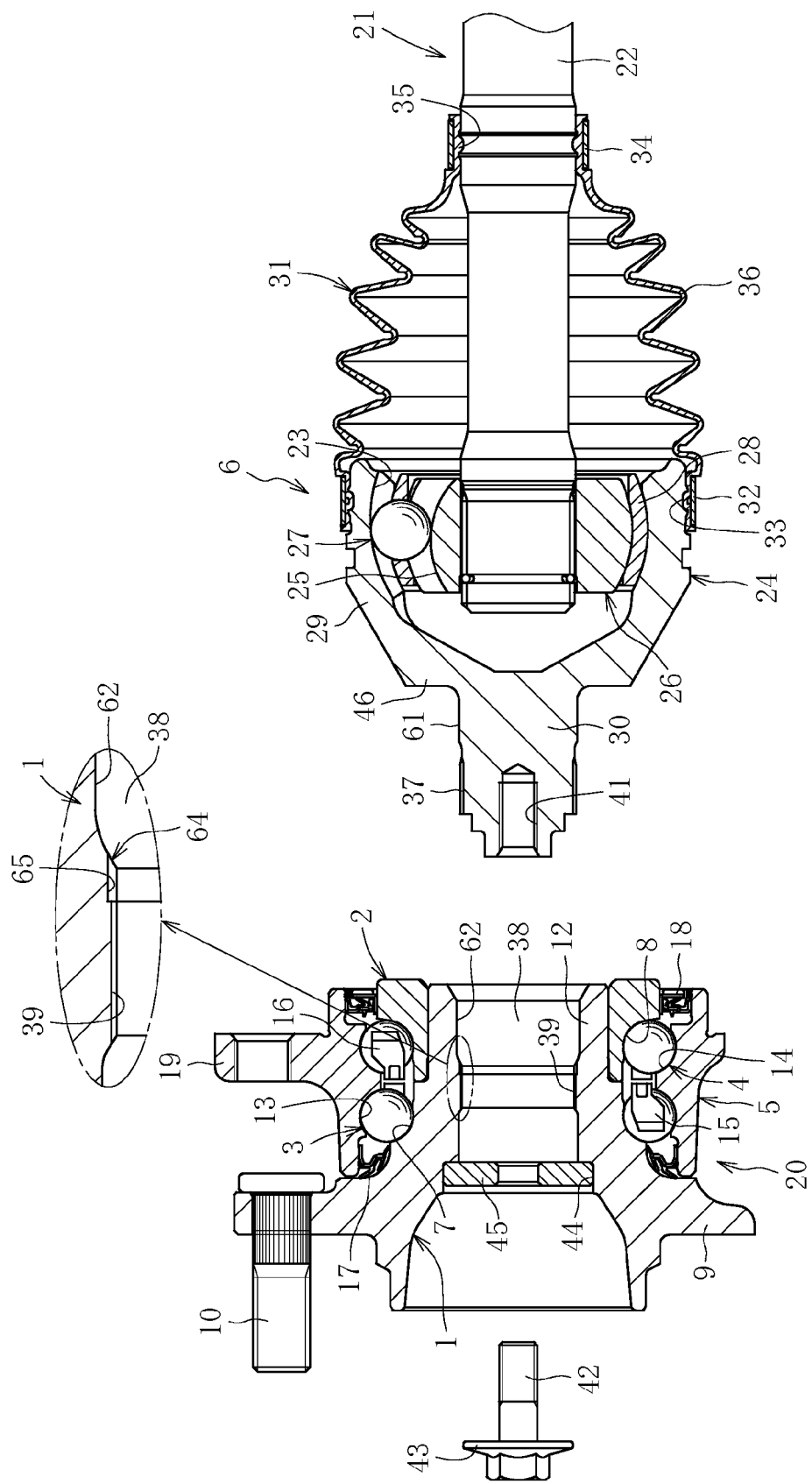
FIG. 18 is a sectional view illustrating a state before mounting the constant velocity universal joint to a bearing for a wheel having a non-crimping structure with an annular plate fitted into a shaft hole of a hub wheel in a bearing device for a wheel according to still another embodiment of the present invention.
Figure 19:
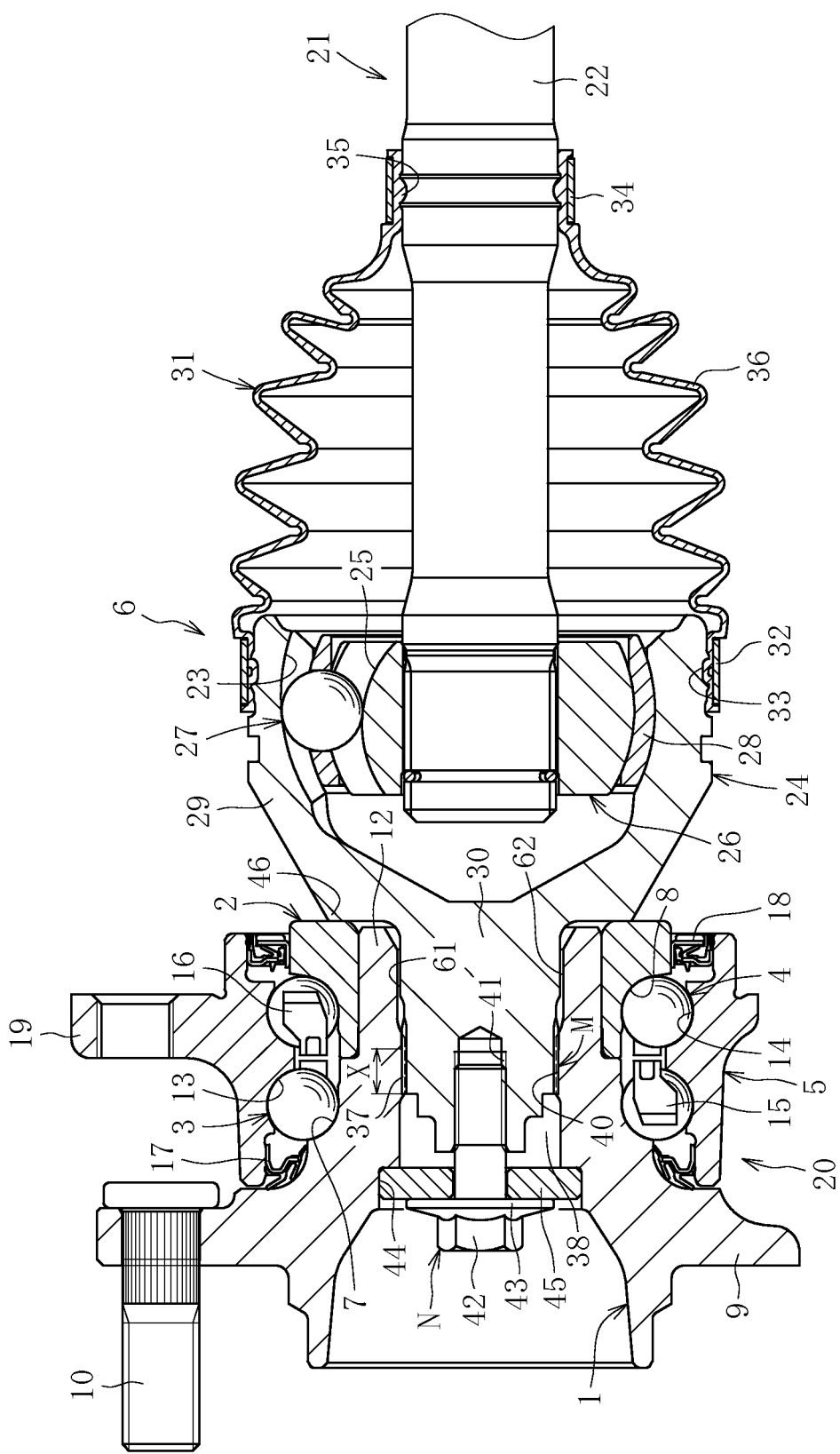
FIG. 19 is a sectional view illustrating a state after mounting the constant velocity universal joint to the bearing for a wheel of FIG. 18.

The embodiment illustrated in FIGS. 16 and 17 exemplifies the crimping structure in which the end portion of the small-diameter step portion 12 of the hub wheel 1 on the inboard side is crimped outward by orbital forming so that the inner race 2 is retained by the crimped portion 11 and integrated with the hub wheel 1, to thereby apply preload to the bearing 20 for a wheel. Alternatively, a non-crimping structure as illustrated in FIGS. 18 and 19 may be employed. FIG. 18 illustrates a state before mounting the constant velocity universal joint 6 to the bearing 20 for a wheel, and FIG. 19 illustrates a state after mounting the constant velocity universal joint 6 to the bearing 20 for a wheel. This embodiment provides a structure in which the inner race 2 is press-fitted to the small-diameter step portion 12 of the hub wheel 1 and the end surface of the inner race 2 is brought into abutment against the end surface of the shoulder portion 46 of the outer joint member 24. When this structure is employed, the weight can be reduced because the crimped portion 11 (see FIGS. 16 and 17) is omitted, and the cost can be reduced because the process involving orbital forming is unnecessary.

Note that, also in this case, due to the non-crimping structure, the use of a bolt 42 subjected to surface treatment with an axial force stabilizer is effective in that fluctuation in axial force with respect to the fastening torque of the bolt 42 can be reduced. Further, in the embodiment of FIGS. 18 and 19, other structural features such as the formation of the concave portions 39 on the shaft hole 38 of the hub wheel 1 by broaching and the lock of the head of the bolt 42 on the end surface of the annular plate 45, a procedure of mounting the bearing 20 for a wheel to the suspension device of the vehicle body, and a procedure of mounting the constant velocity universal joint 6 of the drive shaft 21 to the bearing 20 for a wheel are similar to those in the embodiment of FIGS. 16 and 17, and hence identical or corresponding parts to those in FIGS. 16 and 17 are represented by the same reference symbols to omit redundant description thereof.

Note that, the above-mentioned embodiments exemplify the structure in which the bolt 42 is threadedly engaged with the female thread portion 41 of the stem section 30 and fastened in a state of being locked on the end surface of the hub wheel 1 or the end surface of the annular plate 45. As an alternative screw fastening structure, there may be employed a structure comprising a male thread portion formed at the axial end of the stem section 30 of the outer joint member 24, and a nut serving as a female thread portion to be locked on the end surface of the hub wheel 1 or the end surface of the annular plate 45 in a state of being threadedly engaged with the male thread portion. In this structure, the nut is threadedly engaged with the male thread portion of the stem section 30 and fastened in a state of being locked on the hub wheel 1 or the annular plate 45, to thereby fix the constant velocity universal joint 6 to the hub wheel 1.

Further, the above-mentioned embodiments exemplify the case where the present invention is applied to a bearing device for a driving wheel of the type in which one of the double-row inner raceway surfaces 7 and 8 formed on the inner member comprising the hub wheel 1 and the inner race 2, that is, the inner raceway surface 7 on the outboard side is formed on the outer circumference of the hub wheel 1 (referred to as "third generation"). However, the present invention is not limited thereto, but is also applicable to a bearing device for a driving wheel of the type in which a pair of inner races is press-fitted to the outer circumference of the hub wheel and the raceway surface 7 on the outboard side is formed on the outer circumference of one of the inner races, whereas the raceway surface 8 on the inboard side is formed on the outer circumference of the other of the inner races (referred to as "first generation" and "second generation").

The present invention is not limited to the above-mentioned embodiments. As a matter of course, the present invention may be carried out in various other embodiments without departing from the gist of the present invention. The scope of the present invention is defined by the claims, and encompasses meanings of equivalents of elements described in the claims and all modifications within the scope of the claims.

The invention claimed is:

1. A bearing device for a wheel, comprising a bearing for a wheel comprising:
    an outer member having double-row outer raceway surfaces formed on an inner circumference thereof;
    an inner member comprising a hub wheel and an inner race, the inner member having double-row inner raceway surfaces formed on an outer circumference thereof so as to be opposed to the double-row outer raceway surfaces; and
    double-row rolling elements interposed between the double-row outer raceway surfaces of the outer member and the double-row inner raceway surfaces of the inner member,
    the bearing for a wheel having a constant velocity universal joint coupled thereto with a screw fastening structure by fitting a stem section of an outer joint member of the constant velocity universal joint to a shaft hole of the hub wheel,
    wherein the shaft hole of the hub wheel is formed by penetrating the hub wheel into a cylindrical shape over an axial direction of the hub wheel,
    wherein the outer joint member comprises a plurality of convex portions formed on an outer circumferential surface of the stem section thereof so as to extend in the axial direction,
    wherein the hub wheel comprises a plurality of concave portions formed on an inner circumferential surface of the shaft hole thereof by broaching so as to have interferences with the plurality of convex portions, respectively, and
    wherein the stem section of the outer joint member is press-fitted to the shaft hole of the hub wheel, and a shape of each of the plurality of convex portions is transferred to the inner circumferential surface of the shaft hole, to thereby define a convex and concave fitting structure in which the plurality of convex portions and the plurality of concave portions are brought into close contact with each other at an entire fitting contact portion therebetween.

2. The bearing device for a wheel according to claim 1, wherein the screw fastening structure comprises:
    a female thread portion formed at an axial end of the stem section of the outer joint member; and
    a male thread portion to be threadedly engaged with the female thread portion, the male thread portion being locked on a circumferential edge portion of an opening end of the shaft hole of the hub wheel.

3. The bearing device for a wheel according to claim 1, wherein the screw fastening structure comprises:
    a female thread portion formed at an axial end of the stem section of the outer joint member; and
    a male thread portion to be threadedly engaged with the female thread portion, the male thread portion being locked on an annular plate fitted to an opening end of the shaft hole of the hub wheel.

4. The bearing device for a wheel according to claim 1, wherein an end portion of the hub wheel on an inboard side is crimped radially outward so that the inner race is retained by a crimped portion and integrated with the hub wheel, and that the crimped portion is brought into abutment against a shoulder portion of the outer joint member of the constant velocity universal joint.

5. The bearing device for a wheel according to claim 1, wherein an end surface of the inner race positioned on an inboard side of the hub wheel is brought into abutment against an end surface of a shoulder portion of the outer joint member of the constant velocity universal joint.

6. A bearing for a wheel, comprising:
- an outer member having double-row outer raceway surfaces formed on an inner circumference thereof;
- an inner member comprising a hub wheel and an inner race, the inner member having double-row inner raceway surfaces formed on an outer circumference thereof so as to be opposed to the double-row outer raceway surfaces; and
- double-row rolling elements interposed between the double-row outer raceway surfaces of the outer member and the double-row inner raceway surfaces of the inner member,
- wherein a shaft hole of the hub wheel is formed by penetrating the hub wheel into a cylindrical shape over an axial direction of the hub wheel, and
- wherein the hub wheel comprises concave portions formed on an inner circumferential surface of the shaft hole thereof by broaching so as to extend in the axial direction.

* * * * *